(12) United States Patent
Kim et al.

(10) Patent No.: US 10,042,533 B2
(45) Date of Patent: Aug. 7, 2018

(54) GRAPHICAL USER INTERFACE THAT SIMPLIFIES USER CREATION OF CUSTOM CALCULATIONS FOR DATA VISUALIZATIONS

(71) Applicant: Tableau Software, Inc., Seattle, WA (US)

(72) Inventors: Jun Kim, Sammamish, WA (US); Christopher Richard Stolte, Seattle, WA (US); Jock Douglas Mackinlay, Bellevue, WA (US); Robin Stewart, Washington, DC (US); Bora Beran, Bothell, WA (US); Justin Talbot, Seattle, WA (US); Clark Wildenradt, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 344 days.

(21) Appl. No.: 14/737,380

(22) Filed: Jun. 11, 2015

(65) Prior Publication Data
US 2016/0070451 A1  Mar. 10, 2016

Related U.S. Application Data

(60) Provisional application No. 62/046,794, filed on Sep. 5, 2014.

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0486* (2013.01); *G06F 3/04842* (2013.01);
(Continued)

(58) Field of Classification Search
CPC .. G06F 19/3487; G06F 3/0346; G06F 3/0482; G06F 17/30; G06F 17/30991; G06F 3/04845
See application file for complete search history.

(56) References Cited

U.S. PATENT DOCUMENTS

| | | | |
|---|---|---|---|
| 6,915,298 B1 * | 7/2005 | Cain | G06F 17/30604 |
| 7,023,440 B1 * | 4/2006 | Havekost | G05B 23/0232 |
| | | | 345/440 |

(Continued)

OTHER PUBLICATIONS

Chris Weaver; Building Highly-Coordinated Visualizations in Improvise; © 2004; IEEE; 8 pages. (Year: 2004).*

(Continued)

*Primary Examiner* — Linh K Pham
(74) *Attorney, Agent, or Firm* — Morgan, Lewis & Bockius LLP

(57) ABSTRACT

A method generates a graphical representation of a data source using a graphical user interface. The user interface includes a schema information region and a data visualization region. The schema information region includes field names associated with data fields. The data visualization region includes shelf regions that determine characteristics of a visual graphic. Each shelf region is configured to receive user placement of field names. The user selects field names and places each field name in a respective shelf region. The user edits a first shelf region, creating a first calculated element in the first shelf region. The first calculated element does not match any of the field names in the schema information region. The method generates a visual graphic based on the content of the shelf regions, including the user-selected field names and the first calculated element, and displays the visual graphic in the data visualization region.

26 Claims, 29 Drawing Sheets

(51) Int. Cl.
*G06F 3/0486* (2013.01)
*G06Q 30/00* (2012.01)
*G06Q 40/00* (2012.01)
*G06F 17/30* (2006.01)

(52) U.S. Cl.
CPC ........ *G06F 17/30* (2013.01); *G06F 17/30991* (2013.01); *G06F 17/30994* (2013.01); *G06Q 30/00* (2013.01); *G06Q 40/00* (2013.01)

(56) References Cited

U.S. PATENT DOCUMENTS

| | | | | |
|---|---|---|---|---|
| 7,800,613 | B2* | 9/2010 | Hanrahan | G06T 11/206 345/440 |
| 7,882,144 | B1* | 2/2011 | Stolte | G06F 17/30592 707/786 |
| 8,713,072 | B2 | 4/2014 | Stolte et al. | |
| 9,098,559 | B2* | 8/2015 | Muenkel | G06T 11/206 |
| 2006/0206512 | A1* | 9/2006 | Hanrahan | G06F 17/30554 |
| 2006/0259394 | A1 | 11/2006 | Cushing et al. | |
| 2011/0225525 | A1* | 9/2011 | Chasman | G06F 3/0486 715/763 |
| 2011/0271179 | A1* | 11/2011 | Jasko | G06F 17/30716 715/256 |
| 2011/0302110 | A1* | 12/2011 | Beers | G06F 17/30554 706/11 |
| 2013/0060603 | A1 | 3/2013 | Wagner | |
| 2014/0233719 | A1* | 8/2014 | Vymenets | H04M 3/5183 379/265.03 |

OTHER PUBLICATIONS

Tableau, International Search Report and Written-Opinion, PCTUS2015048624, dated Nov. 26, 2015, 10 pgs.
Tableau, International Preliminary Report on Patentability PCTUS2015048624, Mar. 7, 2017, 7 pgs.
Tableau, Communication Pursuant to Rules 161(2) and 162, EP15771788.5, Apr. 13, 2017, 2 pgs.
Tableau, Examination Report No. 1, AU2015311721, dated Dec. 6, 2017, 4 pgs.

* cited by examiner

Attribute Retention 

| Attribute | Datatype change | Role change | Display type change |
|---|---|---|---|
| Encoding | Not copied | Not copied | Not copied |
| Format (domain) | Not copied | Copied | Copied |
| Sort | Not copied | Copied | Copied |
| Current aggregation (for row level calcs) | Not copied | Not copied | Not copied |
| Geographic role | Re-derived | Re-derived | Re-derived |
| Axis extents | Not copied | Not copied | |
| Filter | Retained | Retained | Retained |
| Quickfilter visibility | Discarded | Retained | Retained |
| Subtotals | Retained (if allowed) | Retained (if allowed) | Retained (if allowed) |
| Show header | Retained (if allowed) | Retained (if allowed) | Retained (if allowed) |
| Ignore in table calc | Retained (if allowed) | Retained (if allowed) | Retained (if allowed) |
| Data blending link | Retained (if allowed) | Retained (if allowed) | Retained (if allowed) |

GRAPHICAL USER INTERFACE THAT SIMPLIFIES USER CREATION OF CUSTOM CALCULATIONS FOR DATA VISUALIZATIONS

RELATED APPLICATIONS

This application claims priority to U.S. Provisional Patent Application No. 62/046,794, filed Sep. 5, 2014, entitled "Graphical User Interface that Simplifies User Creation of Custom Calculations for Data Visualizations," which is incorporated by reference herein in its entirety.

TECHNICAL FIELD

The disclosed implementations relate generally to data visualization and more specifically to systems, methods, and user interfaces that enable a user to interactively explore and investigate a data set.

BACKGROUND

Data visualization applications enable a user to understand a data set visually, including distribution, trends, outliers, and other factors that are important to making business decisions. Some data sets are very large or complex, and sometimes unique formulas are needed to identify the structure.

Users often create calculations to experiment or break down parts of existing formulas to see how different portions of formulas act. Being able to quickly create custom calculations facilitates the exploration process. Some data visualization applications provide for custom calculations, but impose a rigid process that requires pre-creating and naming each calculation before it can be used. This is a slow and inefficient process, and the temporary calculations create unnecessary clutter.

SUMMARY

Disclosed implementations address the above deficiencies and other problems associated with custom calculations for data visualizations. Calculations can be created anywhere data fields can be used, and can be created on the fly as needed, without creating a named calculation. Text and other screen objects may be dragged and dropped (or copied and pasted) anywhere that a formula may be used. Custom calculations are sometimes referred to as ad hoc calculations or ad hoc calcs.

Some implementations have designated shelf regions that determine the characteristics of the displayed data visualization. For example, some implementations include a row shelf region and a column shelf region. A user places field names into these shelf regions (e.g., by dragging fields from a schema region), and the field names define the data visualization characteristics. For example, a user may choose a vertical bar chart, with a column for each distinct value of a field placed in the column shelf region. The height of each bar is defined by another field placed into the row shelf region.

In some implementations, field names are displayed graphically as boxes or "pills" as they are moved into a shelf region. When a shelf region has two or more field names, the boxes or pills help to distinguish the multiple items visually.

In accordance with some implementations, a computer-implemented method executes at a client device with one or more processors and memory. The method generates a graphical representation of a data source. The method generates and displays a graphical user interface on a computer display. The graphical user interface includes a schema information region and a data visualization region. The schema information region includes multiple field names, and each field name is associated with one or more data fields from the data source. In some instances, a field name corresponds to a single data field in the data source (e.g., the field name is the same as the data field name or an alias for the data field). In some instances, a field name corresponds to two or more database fields (e.g., a permanently saved calculation, such as field1−field2). The data visualization region includes a plurality of shelf regions that determine characteristics of a visual graphic displayed in the data visualization region. Each shelf region is configured to receive user placement of one or more of the field names from the schema information region. Each shelf region is also configured for editing, so that a user may create custom calculations directly in a shelf region.

The method detects a user selection of one or more of the field names and a user placement of each user-selected field name in a respective shelf region in the data visualization region. The method also detects user input to edit a first shelf region, resulting in a first calculated element in the first shelf region. The first calculated element does not match any of the field names in the schema information region (i.e., it is an ad hoc custom calculation). Note that the first calculated element may use field names in the schema information region. For example, suppose field1 and field2 are both in the schema information region, and the first calculated element has formula field1/field2. This formula for the first calculated element does not match either "field1" or "field2" in the schema information region.

The method generates a visual graphic in accordance with the data source and content of the respective shelf regions, including user-selected field names and the first calculated element, and displays the visual graphic in the data visualization region. In some implementations, the displayed visual graphic is updated each time the user modifies the content of any shelf region (e.g., regenerated and redisplayed). In some implementations, the user must explicitly issue an instruction to update the displayed graphic (e.g., if it takes a long time to regenerate the visual graphic, the user may prefer to wait until the layout is more fully defined). In some implementations, the user can choose to have automatic updates turned on or off.

In some implementations, the plurality of shelf regions includes a row shelf region and a column shelf region. The visual graphic includes visual marks corresponding to retrieved tuples from the data source, and the vertical and horizontal placement of the visual marks are respectively based on items in the row shelf region and column shelf region. Each item of the items is a user-selected field name or the first calculated element. In some instances, the items in the row shelf region include the first calculated element.

In some implementations, each shelf region includes zero or more items, where each item is a field name or the first calculated element. Each respective item is displayed within a respective unique box in a respective shelf region. In some implementations, the boxes are substantially rectangular. In some implementations, each box is substantially oval or pill shaped (e.g., somewhat rectangular, but with rounded corners or rounded on the short sides). Pill-shaped boxes are illustrated in some of the screen shots in FIGS. 6-30.

In some implementations, the user input to edit the first shelf region includes receiving typing input in a first box in the first shelf region, thereby converting the content of the first box from a first field name to a formula for the first calculated element. Before the editing, the expression in the box is just the first field name, and after the editing, the expression in the box changes. Note that the new expression in the box may include the first field name. For example, prior to editing, the expression may be "SUM(sales)" (an aggregate instance of the field name "sales") and after the editing the expression may be "SUM(sales)−1000" or something else that includes the "sales" field. In some implementations, the typing input is concatenated with the first field name already in the first box, so that the formula includes the first field name. In some implementations, field names are enclosed in square brackets, such as "SUM([sales])."

In some implementations, the user input to edit the first shelf region includes receiving user input to initiate editing in the first shelf region, outside of any existing box in the first shelf region. This creates a new box for the first calculated element. The method then receives textual user input in the new box, which creates the first calculated element. In some implementations, the textual user input is received in one or more ways. In some instances, the user provides textual input by typing into the new box. In some instances, the user provides textual input by pasting text into the new box. In some instances, the user provides textual input by dragging a field from the schema information region into the new box. In some instances, the user provides textual input by dragging text from another user interface object into the new box. In some instances, the user provides textual input by dragging a non-textual user interface object into the new box. In some implementations, dragging a non-textual user interface object into the new box modifies the existing content of the new box by concatenating the existing content with a string corresponding to a formula for the non-textual user interface object. A user may use various combinations of editing techniques to create a single custom calculation. A user may create any number of distinct custom calculations for a single visual graphic.

In some instances, the pre-existing content of the new box is an expression that includes a plurality of field names, including a second field name. In some instances, the method receives a dragging operation that drops on top of the second field name within the new box. In this case, the user has indicated that the dropping operation should replace the item under the drop location (i.e., the second field name). In response to the dragging operation, the method modifies the pre-existing content of the new box by replacing the second field name with an expression corresponding to the dragging operation.

In some implementations, the first shelf region includes a first box, and the user input to edit the first shelf region includes receiving user input to open a calculation edit window corresponding to the first box. The user provides textual user input into the opened calculation edit window, which becomes a formula for the first calculated element. At some point the user provides input (e.g., pressing ENTER or clicking on an APPLY or SAVE button) to apply the formula for the first calculated element.

In some implementations, the user provides the textual input by typing into the calculation edit window, pasting text into the calculation edit window, dragging a field from the schema information region into the calculation edit window, dragging text from another user interface object into the calculation edit window, or dragging a non-textual user interface object into the calculation edit window.

In some instances, the method further includes receiving user input to select a portion of text in the calculation edit window. The user then pastes the selected portion of text into a second shelf region distinct from the first shelf region, thereby creating a second box in the second shelf region. The formula for the second box is the selected portion of text. The method generates an updated visual graphic for the data source based on the content of the shelf regions, including user-selected field names and the first calculated element. The method displays the updated visual graphic in the data visualization region.

In some implementations, receiving user input to open a calculation edit window corresponding to the first box includes receiving user input to activate an editor icon corresponding to the first box. In some implementations, each box includes a small editor icon (e.g., on the rightmost end of the box), which can be used to invoke the calculation edit window (e.g., by clicking on the icon). In some implementations, the calculation edit window is non-modal.

In some implementations, the user input to edit the first shelf region includes pasting a text string into the first shelf region.

In some implementations, a user wants to save a calculation. For example, a user may try several versions of a formula before getting to the "right" one. Once the user is happy with the results, the user may choose to save the calculation for future use. In some implementations, the user can save a custom calculation by dragging or copying the calculation to the schema information region (e.g., dragging the formula string to the schema information region or dragging the box containing the custom calculation to the schema information region). The method receives the user input to copy the first calculated element to the schema information region. In response to the user input to copy the first calculated element, the method creates a new field name in the schema information region whose calculation formula corresponds to the first calculated element. In some implementations, the default name for the field is the calculation formula. In some implementations, the user can assign a different name (i.e., an alias) for the calculation. Once the new field name is created, the method updates the first calculated element in the first shelf region to refer to the new field name (i.e., it is no longer a "custom calculation" because it is now a saved named field).

In some implementations, the method includes receiving subsequent user input to edit the first calculated element, thereby creating a second calculated element that replaces the first calculated element. The method then generates an updated visual graphic in accordance with the data source and the content of the shelf regions, including user-selected field names and the second calculated element. The method then displays the updated visual graphic in the data visualization region.

Thus methods, systems, and graphical user interfaces are provided that enable users to quickly create custom calculations without cluttering the user interface with temporary calculations.

BRIEF DESCRIPTION OF THE DRAWINGS

For a better understanding of the aforementioned embodiments of the invention as well as additional embodiments thereof, reference should be made to the Description of Implementations below, in conjunction with the following drawings in which like reference numerals refer to corresponding parts throughout the figures.

FIG. 3 provides a table illustrating the retention of calculation attributes in accordance with some implementations.

FIGS. 6-30 are screen shots illustrating various features of some disclosed implementations.

Figure 1:
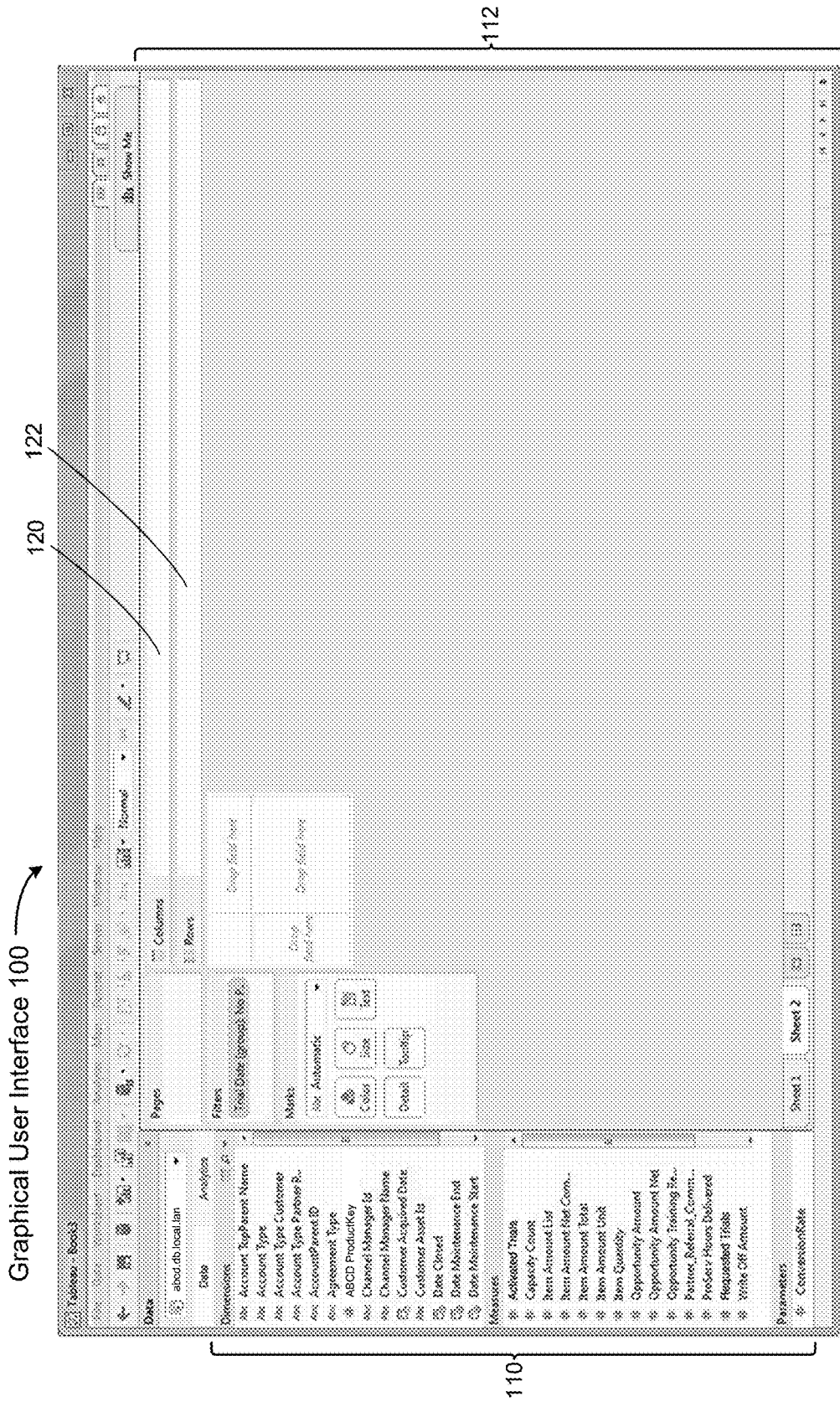
FIG. 1 illustrates a graphical user interface used in some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Disclosed implementations enable users to create calculations in a more ad hoc fashion. For example, the ability to type directly into a box or pill allows users to type in a calculation directly, without first having to create a calculation in the data pane (also known as the schema information region). Unnamed calculations such as these provide additional flexibility and ease of use.

Some implementations distinguish between trivial expressions and non-trivial expressions when a user creates a custom expression. A trivial expression is one that is easily converted to an instance of a field that already exists in the data pane. For example, trivial expressions include: a field name of a dimension field; a field name of a measure field; a field name that matches a calculation that is saved in the data pane; and an aggregate function with a simple field name as input, such as SUM(profit).

Non-trivial expressions become unnamed custom calculations because they cannot be converted to instances of existing fields from the data pane. Non-trivial expressions include: row level calculations (e.g., expressions involving two or more fields from the data source); an aggregate function with a calculation as input (e.g., SUM(revenue−expenses)); and an aggregate level expression (e.g., SUM(revenue)/SUM(expenses)).

In some instances, two or more instances of the same custom calculation may be used in two or more distinct shelves. If the expressions are the same, they will have the same results for each usage. If there are multiple instances of the same custom calculation, and the user subsequently edits one of the instances, only the instance that is edited is changed. The other instances retain the previous calculation unless they are individually edited. Note that his behavior is different from using a named custom calculation from the data pane. With a named custom calculation in the data pane, if the formula is subsequently changed, each usage of the named custom calculation uses the modified formula.

In some implementations, a user can replicate a calculation. In some instances, a user replicates a calculation by selecting the formula, and copying the text of the formula to another location (e.g., another shelf). Placing the text on another shelf creates a new box or pill whose formula is the copied text string. In some implementations, a user can duplicate a calculation from a pill by using a CTRL-drag operation. In this case, the existing pill stays in its current location (shelf), and a second pill is spawned. The new instance of the pill may be dragged onto another shelf. In some implementations, a user can use a Duplicate command from a context-sensitive menu (e.g., from a right click), from a regular menu, or from a toolbar icon to create a duplicate of the calculation pill, then drag the duplicate to an appropriate shelf. As noted above, once a duplicate is created, it is independent of the original calculation pill.

Some implementations support multiple sheets within the data visualization region. Sheets within the data visualization region are like sheets within a spreadsheet application. Each sheet has a distinct visual graphic based on various user selections, and the visual graphics on distinct sheets may have different chart types (e.g., a bar graph on one sheet and a scatter plot on another sheet). Because each calculation pill is independent of the others, there is no synchronization across sheets regarding calculation formulas.

When a user edits a pill (either directly in the pill or using a calculation edit window), the details of the save operation depend on the contents before and after the edit.

In some instances, a user edits a trivial expression so that it becomes a different trivial expression. When the change is applied or saved, the expression is saved as a reference to the appropriate field name from the data pane. It is not saved as a custom calculation.

In some instances, a user edits a trivial expression so that it matches the expression of a named calculation field. This is still a trivial expression. When the change is applied or saved, the expression is saved as a reference to the appropriate field name of the matching expression from the data pane. It is not saved as a custom calculation.

In some instances, a user edits a non-trivial expression to form a different non-trivial expression. In this case, it was a custom calculation before the change, and is still a custom calculation after the change. The custom calculation now has a different formula.

In some instances, a user edits a trivial expression such that it becomes a non-trivial expression. When the change is applied or saved, the pill becomes a custom calculation pill, with the non-trivial expression as the formula.

In some instances, a user edits a non-trivial expression such that it becomes a trivial expression. When the change is applied or saved, the pill is no longer a custom calculation pill. Instead, the pill just refers to the appropriate field name from the data pane.

In some instances, a user edits a non-trivial expression that is also used on another sheet, resulting in a different non-trivial expression. The result is the same as when the expression is used in multiple places on the same sheet. That is, the edited instance is still a custom calculation after the change. The custom calculation has a different formula. The edit on one sheet does not affect any other custom calculation instances.

In some instances, a user edits a non-trivial expression to make a different non-trivial expression, and the new non-trivial expression is the same as the non-trivial expression for another calculation pill (used on the same sheet or on another sheet). At this point, the matching calculation expressions will produce the same results, but they are not linked. Any future edits to either of the fields will result in different expressions.

In some instances, a user edits a non-trivial expression so that its data type becomes different (e.g., the data type may change from character string to numeric or vice versa). When the change is applied or saved, the visual graphic is regenerated based on the new calculation formula. In particular, this may result in a different type of visual graphic or a different layout of the data. For example, if the calculation changes from producing a discrete data type to producing a continuous data type (or vice versa), the visual graphic may change how the rows or columns are laid out.

In some instances, a user edits a non-trivial expression so that it uses a field from a different data source. From a user perspective, this is no different from using a field from the same data source. Either way, the new calculation is a custom calculation unless it is a trivial expression. In some implementations, a single calculation expression may include fields from two or more distinct data sources. This can occur when there are fields in the two data sources that are linked together by sharing matching values for corresponding rows.

In some instances, a user edits a non-trivial expression to become a trivial expression while in the calculation edit window (which is typically non-modal). In some implementations, the calculation remains a custom calculation until the calculation edit window is closed (at which point, the pill is converted to refer to the appropriate field name in the data pane).

In some instances, a user chooses to save a custom calculation that was previously unnamed. In some implementations, a user can save a calculation as a named calculation by dragging the expression for the custom calculation to the data pane. In some implementations, a user can save a custom calculation as a named calculation by dragging a pill that contains the expression to the data pane. In some implementations, a user can save a custom calculation as a named calculation by copying the expression to the user interface clipboard and pasting the expression at a location in the data pane. In some implementations, a user can save a custom calculation as a named calculation by copying the expression from the calculation edit window to a location in the data pane (either by dragging or using cut/paste). When a user initiates saving a calculation as a named calculation, the user is prompted to give the expression a name. In some implementations, the default name is the custom expression itself. In some circumstances, the source of the custom expression is converted to refer to the new named calculation without any specific user input (e.g., when the pill containing the expression is dragged to the data pane). In some implementations, when just the expression for the custom calculation is dragged or copied to the data pane, the pill remains a custom calculation. In some implementations, once a calculation is saved as a named calculation, all instances of custom calculations whose formulas match the formula for the newly saved named calculation are converted to references to the new named calculation. In some implementations, this is true even for instances of the same calculation on different sheets.

In most ways, a custom (unnamed) calculation can be used in the same ways as field names from the data pane. In some implementations, many of the usages are available from a context sensitive menu (e.g., using a right click) from a field pill, and are available to an unnamed calculation as well. In some implementations, the usages include: filtering, sorting, formatting, display type (continuous versus discrete), aggregation, some table calculations, in headers, inclusion in tooltips, and inclusion in subtotals. In some implementations, a context sensitive menu also includes options to duplicate a custom calculation and/or to set/unset a geographic role for the custom calculation. In some implementations, when one or more fields used in a custom expression have a geographic role, the custom expression has a geographic role by default.

Some operations that are generally available for named fields are not available to custom calculations. In some instances, the operations would not make sense for an ephemeral calculation. For example, the following operations are generally not available for ad hoc calculation: an ad hoc calculation does not have a default value; a user cannot assign a data type to an ad hoc calculation because the data type is inferred from the formula; and a user cannot include an ad hoc calculation in a group or a set. Typically a user cannot assign an alias to an ad hoc calculation because users would not have a need to provide an alias for a calculation that is short-lived.

In some implementations, an ad hoc calculation does not appear as an option in any list of fields associated with the data source. For example, ad hoc calculations are generally not included in a parameter dialog to populate a domain. Similarly, an ad hoc calculation does not appear in a field list in a calculation dialog box, a filter dialog box, or to create an action.

Conversely, ad hoc calculations are typically shown in sheet oriented lists, such as for the creation of a reference line or for table calculation addressing or partitioning.

In some implementations, fields are stored in the data source that "owns" them. Some implementations include a hierarchical structure to support scoping of field ownership. In some implementations, an ad hoc calculation is stored as a field that has been tagged as being "unnamed," and is created in the owning data source. An ad hoc calculation coexists alongside all other fields in that data source, but has a UI attribute that marks it as "unnamed." Unnamed calculations are treated differently in several circumstances, including: an ad hoc calculation (i.e., unnamed calculation) is not displayed in the schema viewer (the data pane); an ad hoc calculation is not displayed in lists of fields associated with the data source (as noted above); and ad hoc calculations are not written to the "datasources" section of a workbook XML file or data source file (e.g., TDS file). Ad hoc calculations are stored in the datasource-dependencies section of sheets that use them. In some implementations, unused ad hoc calculations are pruned when the workbook is written.

In some implementations, serialized data sources do not contain unnamed calculations because there are no sheets. In some implementations, ad hoc calculations cannot be stored with a data server data source (e.g., because users have read-only access).

Because an ad hoc calculation is unnamed, a user cannot refer to the ad hoc calculation in other calculations. (However, a user could copy the expression for an ad hoc calculation into another calculation.)

In some implementations, each unnamed ad hoc calculation has a unique internal "field name." In some implementations, this internal name is not visible to users. The caption for an ad hoc calculation is the calculation expression. When the calculation expression has multiple lines (e.g., separated by carriage return+linefeed), some implementations use the first line of the calculation expression as the caption.

For named fields, implementations typically require unique captions and unique field names. The captions for unnamed fields are not required to be unique, nor are the captions of unnamed calculations considered when determining the uniqueness of named fields. The field names, including the visible field names of named fields as well as the internal field names assigned to unnamed ad hoc calculations, are unique.

Because an ad hoc calculation is stored differently than a named field, and editing in a pill can convert a named field to an ad hoc calculation (or vice versa), some implementations treat each save or apply action as a replacement operation. This is true regardless of whether editing directly in a pill or editing in the calculation edit window. Rather than consider a change as a modification of the current pill, the formula is analyzed to determine what field should be dropped into the edited location. When there is a change, a replace operation removes the old field and creates the new one. Certain attributes of the old field are carried forward to the new field when the new field shares characteristics of the old field, as illustrated in FIG. 3.

As noted above, some implementations distinguish between trivial and non-trivial expressions when a user creates a calculation. Creation of an unnamed calculation is not always required. If the expression is a simple field name, the pill will refer to a dimensional instance of that field when the field's default role is dimensional. If the expression is a simple field name and that field's default role is a measure, the pill will apply the default aggregation of that field (typically SUM). The field will be discrete or continuous based on the default for the field. Because the field name does not have a data source prefix, there is potential ambiguity if the data pane includes two or more data sources and the same field name is used in more than one data source. Implementations provide a deterministic ordering to the data sources, and the data sources are examined in that order to find a matching field name. In looking for field names for a new calculation, the primary data source of the sheet is consulted first, then any secondary data sources that are already in use are consulted in alphabetical order (by caption). Finally, other secondary data sources (not in use) are searched. If an existing calculation is edited, the data source of the existing calculation will be searched first, then the data sources will be searched just as in the new calculation case.

If the expression is a simple derivation function, with a single input field, the pill will refer to an instance of the field with the given derivation. A "derivation function" is any aggregate or binning function that may be applied to the field (e.g., accessible from a context sensitive menu). The aggregate functions typically include SUM, COUNT, MIN, MAX, and AVG (mean), and some implementations include others or use different names for the functions. The binning functions typically include date bin functions (YEAR, MONTH, etc. . . . ), which group together rows into bins based on sharing date attributes (e.g., the same year).

If the expression does not fall into either of the categories described above (not a simple field name and not a simple derivation), an unnamed ad hoc calculation is created.

Certain other attributes of ad hoc fields are determined in various ways based on their formulas. One attribute that can be determined is the "role" of the calculation. In this context, the role refers to whether the calculation is treated as a dimension or a measure. Some implementations determine the role of a new ad hoc field in one of two ways. If it is an aggregate, it is a measure (essentially by definition). If it is not an aggregate, the presence of any dimensional field reference in the formula results in treating the unnamed ad hoc calculation as a dimension. Otherwise, the new ad hoc calculation is treated as a measure and a default aggregate is applied based on the data type of the expression (SUM for numeric data types, COUNT for any other data type). In some implementations, the user can override the determined role.

Another attribute that is determined is the default display type, which specifies whether a field is treated as discrete or continuous. The default display type for the ad hoc field is determined by data type. For numeric and date data types, the display type is continuous, and other data types (e.g., character strings and Booleans) have a discrete display type.

Another attribute that is determined is whether the ad hoc field has a geographic role. Various fields are designated as having a "geographic role" when the data in the field defines a location, such as a country, a state, a city, or a postal code. When an unnamed ad hoc calculation is treated as a dimension and is based on a single input field that has a geographic role, the ad hoc calculation inherits that geographic role.

When a user applies or saves an edited ad hoc calculation (i.e. leaves editing mode), there may be significant adjustments required in the visualization to respond to the changed state. If a continuous ad hoc calculation becomes discrete, the calculation may need to be repositioned on the shelf where it is located. If the calculation is used as a filter, it may require a change to the filter user interface. Trend lines, reference lines and other layered analytics may need to be updated. In general, these situations are treated identically to the case where a user edits the formula of a named field in the data pane when the named field is already in use on one or more shelves.

In the case where the user chooses to apply changes without closing the editing session, the user interface changes take into consideration what a user would expect. In particular, the behavior should be consistent rather than dependent on the change that was made. However, changes that leave the existing state invalid require some change to the interface or risk errors in expected behavior.

Some implementations address this issue by invalidating the visualization until the user leaves editing mode. This achieves the interface change without causing any jarring changes that could interrupt the user's flow. However, this methodology fails to give the user meaningful feedback. Because the user has chosen "apply" in an effort to get such feedback, this response goes against user expectation. In other implementations, the necessary changes are made, including the possibility of moving the pill being edited, but return the state of the user interface to the state it was in at the time "apply" was selected. For example, the pill editor remains open, and the cursor remains in the same place within the expression. However, the pill may have moved. The calculation edit window follows the same guidelines.

Unnamed ad hoc calculations fill the need for "one off" calculations. Because of this, each instance of an ad hoc calculation is separate, even if two or more ad hoc calculations have the same formula. Each is a distinct, separate field (e.g., stored as a separate unnamed field with its own unique field name that is not visible to users), with its own encodings, formatting, and other style information.

When an ad hoc calculation is applied or saved, implementations use the formula expression to determine what action to take. As noted above, some of the expressions are considered "trivial," which includes expressions that are easily converted to instances of fields that already exist in the data pane.

When the expression is a simple field name of a dimension, implementations create a default instance of the given field name. When the expression is a simple field name of a measure, implementations create a default aggregate instance of the given field name. When the expression is a simple field name that is a non-aggregate calculation, implementations create a default instance of the given field name. When the expression is a simple field name that is an aggregate calculation, implementations create a default AGG_USER instance of the given field name. When the expression is an aggregate function with a simple field name as input, implementations create a default instance of the given field name with the user-specified aggregation set as the given aggregate.

Non-trivial expressions use unnamed ad hoc calculations. When the expression is a row level calculation, implementations create an unnamed calculation with the given formula. In some implementations, this is a dimensional instance or a measure instance based on the data type of the expression. In some implementations, it defaults to a dimensional instance. When the expression is a simple aggregate function with a calculation as input, implementations create an unnamed calculation with the input formula and use an aggregate instance of the field. When the expression is an aggregate level expression, implementations create an unnamed calculation with the entire expression as the formula and use an AGG_USER instance.

In some instances, a user can create copies of an existing ad hoc calculation. In some instances, the copy is used on the same sheet (e.g., in a different shelf on the same sheet). In some implementations, a user can perform a CTRL-drag of an unnamed calculation pill, thereby creating a new unnamed calculation with the same formula. The column properties of the source pill are duplicated to the new entry. The calculations are not, however, linked in any way. In some implementations, a user can use a context sensitive menu from the unnamed calculation pill (e.g., using a right click) to access a "Duplicate" command. A new unnamed calculation is created with the same formula and the column properties of the source pill are duplicated to the new entry. Again, the calculations are not linked.

In some implementations, an ad hoc calculation can be copied to another sheet in the data visualization region. In some instances, a user creates a non-trivial ad hoc expression in a first sheet, then creates the same expression in the second sheet. A new unnamed calculation is created, without regard for the existence of the same calculation on the first sheet. In some instances, a user creates a non-trivial ad hoc expression on a shelf with encodings in a first sheet, then types the same expression on the same encoding shelf in a second sheet. A new unnamed calculation is created without regard for the existence of the same calculation in the first sheet. The new calculation gets the default set of encodings, and the encodings set on the first sheet are ignored. In some implementations, a user may create a duplicate of an entire sheet. If there are any ad hoc custom calculations on the first sheet, the same ad hoc calculation expressions are copied to the second sheet, but the ad hoc calculation instances on the two sheets are distinct.

An aspect of the current disclosure is that users can edit expressions at any time, without regard to how the data visualization application stores the expressions. Based on the type of change, various data must be updated. This is true whether the user edits the expression directly inside a pill or uses the calculation edit window to edit the expression.

When a user changes a trivial expression to a different trivial expression, implementations replace the original field name with the new field name, as if the user had dragged the new field name from the data pane (schema region) and placed it on top of the original field name.

When a user changes a trivial expression to a non-trivial expression that matches a named calculation field, implementations replace the original field name with the new field name (the named calculation field) as if the user had dragged the new field name from the data pane and placed it on top of the original field name.

When a user changes a non-trivial expression to a different non-trivial expression, implementations create a new unnamed calculation and replace the existing non-trivial expression with the different non-trivial expression. The properties (attributes) are copied when possible, as illustrated in FIG. 3.

When a user changes a trivial expression into a non-trivial expression, implementations create a new unnamed calculation and replace the original field name with the non-trivial expression. The properties are copied when possible, as illustrated in FIG. 3.

When a user changes a non-trivial expression into a trivial expression, implementations replace the original ad hoc calculation with a reference to the appropriate named field.

When a user changes a non-trivial expression that is also used on another sheet into a different non-trivial expression, implementations create a new unnamed calculation and replace the existing expression, but the expression on the other sheet is unchanged. The properties of the new unnamed calculation are copied when possible, as illustrated in FIG. 3.

When a user changes a non-trivial expression into a non-trivial expression that is also used on another sheet (i.e., the new expression is used by an ad hoc calculation on another sheet), implementations create a new unnamed calculation and replace the existing expression. The existence of another ad hoc calculation (on another sheet or elsewhere on the same sheet) with the same formula has no affect. The properties are copied when possible, as illustrated in FIG. 3.

When a user changes a non-trivial expression so that its data type changes, implementations create a new unnamed calculation and replace the existing expression. The properties are copied when possible, as illustrated in FIG. 3.

When a user changes a non-trivial expression so that it uses a field from a different data source, implementations create a new unnamed calculation in the data source corresponding to the new field, and replace the existing expression. The properties are copied when possible, as illustrated in FIG. 3.

When a user changes a non-trivial expression to become a trivial expression while in the calculation edit window, the field name of the trivial expression replaces the ad hoc calculation.

There are cases when the user wants to save an unnamed calculation as a calculation in the data model. In this way, the formula is available for future use (and has already been tested). In some implementations, a user saves an ad hoc calculation by dragging the calculation expression to the data pane. The unnamed calculation is given a caption and the property designating it as "unnamed" is removed. This enables the calculation to appear in the schema viewer (data pane). All existing properties and encodings are retained. In some implementations, the name of the field is retained. In some implementations, a new field name is assigned, either by the user or by the data visualization application. When the same ad hoc calculation formula is used in other places (on the same sheet or on another sheet), the other ad hoc calculations remain unchanged (they are still separate and distinct ad hoc calculations). In some implementations, the other ad hoc calculations that now match a saved named field are converted to references to the newly created named field.

Implementations provide a simple way for users to quickly create prototype calculations without having to save them to the data source. Because of the nature of an ad hoc calculation, each ad hoc calculation instance is independent of all others. However, the expression for an ad hoc calculation can be copied. In addition, a box/pill with an ad hoc calculation can be duplicated.

A user can enter field names (e.g., columns from the data source or named calculations) with or without aggregations into a shelf and by doing so create a pill. A user can enter field names by typing, pasting text, dragging text from another location, or dragging a user interface object. In particular, a user can create calculations by directly typing into a pill.

A user can convert a pill on a shelf in the data visualization region into an ad hoc calculation by editing the content of the pill.

A user can save an ad hoc calculation and make it a named data source calculation.

A user can drag highlighted text from a calculation edit window (e.g., a non-modal calculation editor) onto a shelf and by doing so create an ad-hoc pill on the shelf.

A user can edit an existing ad hoc calculation in place (e.g., in a pill on a shelf) or using a calculation edit window.

A user can use an ad hoc calculation in basic operations (filter, sort, switch discrete/continuous, change aggregation, format, add quick table calculation, etc.).

Ad hoc calculations can be used on any shelf, including filters, pages, and for table calculation addressing and/or partitioning.

A user can easily duplicate an ad hoc calculation, either by copying the calculation formula or by duplicating the pill that contains the ad hoc calculation.

An ad hoc calculation can be used as a tooltip or a label.

In some implementations, as a user enters an ad hoc formula, the user interface provides syntax highlighting and indications of syntactic or semantic errors (e.g., using red squiggly underlining). Some implementations provide completion options based on what the user has already entered.

In some implementations, a user can assign a name and/or a caption to an ad hoc calculation.

In some implementations, clicking or tapping on a shelf (outside of any existing box already on the shelf) creates a new box and any editing action triggers an editor in the box (e.g., typing or pasting from the clipboard). In some implementations, a box on a shelf is resizable both vertically and horizontally.

In some implementations, a user can initiate editing of an existing box on a shelf by double clicking. If the box is not already an ad hoc calculation, it becomes an ad hoc calculation if the user edits it into something other than a named field from the data pane. For example, a user can double click on a box whose expression is SUM([Sales]) and type in "+5" to convert it into the ad-hoc calculation "SUM ([Sales])+5."

If a box is already an ad hoc calculation, a user can convert it to a named field instance by editing it. For example, a user can double click on the ad hoc calculation "SUM([Sales])+5" and remove "+5" to get the trivial expression SUM([Sales]), which corresponds to a named field.

If an ad hoc calculation involves a single field name that has a geographic role, the ad hoc calculation inherits the geographic role. For example, a user can set the field "City" to have a geographic role, then create an unnamed ad hoc calculation to trim some extra characters (e.g., trailing spaces) for geocoding to succeed. The ad hoc calculation inherits the same geographic role.

In some implementations, if an ad hoc calculation involves a single date field that has an associated fiscal year setting, the unnamed ad hoc calculation inherits the fiscal year setting.

Figure 4:
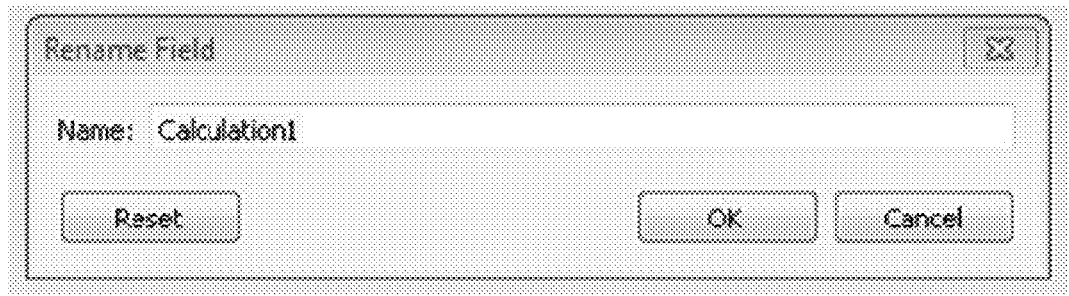
FIG. 4 illustrates saving an ad hoc calculation as a named calculation in accordance with some implementations.

A user can convert an ad hoc calculation to a data source calculation by dragging the calculation to the data pane. When the user drags a calculation to the data pane, the user is prompted to name the calculation, as illustrated in FIG. 4.

After a name is provided, a new field name is added to the data pane. The box/pill that was dragged to the data pane becomes an instance of the new named field. For example, suppose the ad hoc calculation "SUM([Sales])+5" is dragged into the data pane and named as Calculation1, as illustrated in FIG. 4. In place of the box that was dragged into the data pane, the shelf would have a box labeled "Calculation1."

In some implementations, if user does not want the ad hoc calculation to be replaced and wants to create a copy instead, the user may use CTRL+drag instead of a drag operation.

Figure 5:
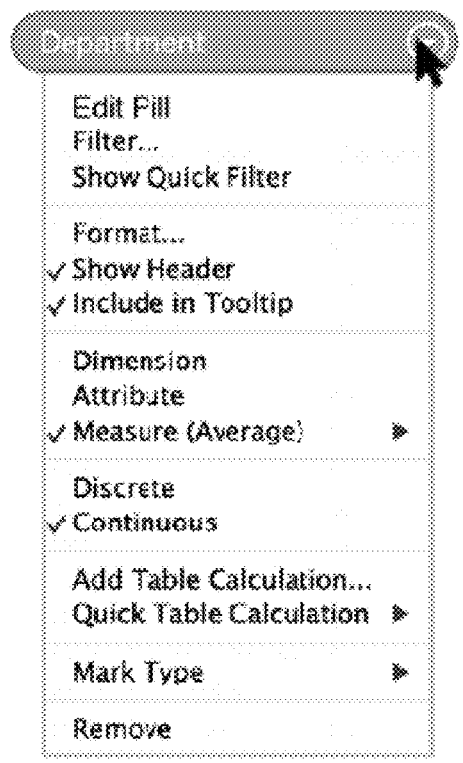
FIG. 5 illustrates a context sensitive menu available for ad hoc calculations in accordance with some implementations.

In some implementations, each ad hoc calculation box/pill has a context sensitive menu (e.g., accessed using a right click) which identifies options that may applied to the ad hoc calculation or identifies ways in which the ad hoc calculation may be used. An example of a context sensitive menu is provided in FIG. 5.

In some implementations, a user can reuse ad-hoc calculations in sheet-scoped dialogs or field lists (i.e., they apply only to a single sheet). For example, in some implementations, ad hoc fields appear as selection options in reference line dialogs, trend line dialogs, forecast dialogs, and table calculation addressing/partitioning lists. In some implementations, ad hoc calculation text is used for axis labels and field headers, and appears in trend line formulas and the legend for measure names. In some implementations, ad hoc fields do not appear in filter dialog field lists or create action field lists, do not appear in parameter dialogs to populate a domain, and are not listed as auto-complete suggestions as users are entering field names.

As noted above, a user can reuse a portion of an ad hoc calculation by dragging the selected portion onto a shelf, into an existing box/pill, or into the data pane. For example, a user can highlight a portion of text from the calculation edit window and drag the portion into a shelf region (e.g., row shelf region or columns shelf region) to turn the highlighted portion into a separate ad hoc calculation.

In one scenario, a user is editing a complex calculation that does not seem to give expected results. The user selects a portion of the calculation text in the editor and drags that portion into a shelf to see if that portion of the calculation returns the expected results. The user edits the calculation using the mini editor for the shelf until the values make sense. Then the user drags the corrected calculation back into the main calculation editor to replace what was copied out to create the ad hoc calculation earlier.

In a second scenario, a user is editing a complex calculation that does not seem to give expected results. The user selects a portion of the calculation text in the editor and drags the portion onto a shelf to see if that portion of the calculation returns the expected results. That portion gives expected results, so the user discards the ad hoc calculation just created and moves on to selecting and dragging another portion of the large calculation onto the shelf for debugging.

In a third scenario, a user is editing a complex calculation, which has parts that produce meaningful results on their own. The user selects a portion of the calculation text in the editor and drags (e.g., CTRL+Drag) the portion onto a shelf or the data pane to create a separate calculation.

In a fourth scenario, a user wants to write a complicated calculation, and recognizes that it would be better to build it incrementally so that each piece can be debugged before moving to the next piece. In this way, the user can trust that each smaller piece is giving correct results before merging them all into a big calculation. The user starts by typing a short calculation into the shelf. The user checks the results and confirms that they make sense. Then the user writes two additional calculations. Once the user is confident about all three pieces, the user invokes the calculation editor window and drags each ad hoc calculation into it, combining them into one big calculation. When the big calculation will be useful to the user both now and in the future, the user may save the big calculation as a permanent named field.

FIG. 1 illustrates a graphical user interface 100 in accordance with some implementations. The user interface 100 includes a schema information region 110, which is also referred to as a data pane. The schema information region 110 provides named data elements (field names) that may be selected and used to build a data visualization. In some implementations, the list of field names is separated into a group of dimensions and a group of measures (typically numeric quantities). Some implementations also include a list of parameters. The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic.

Figure 2:
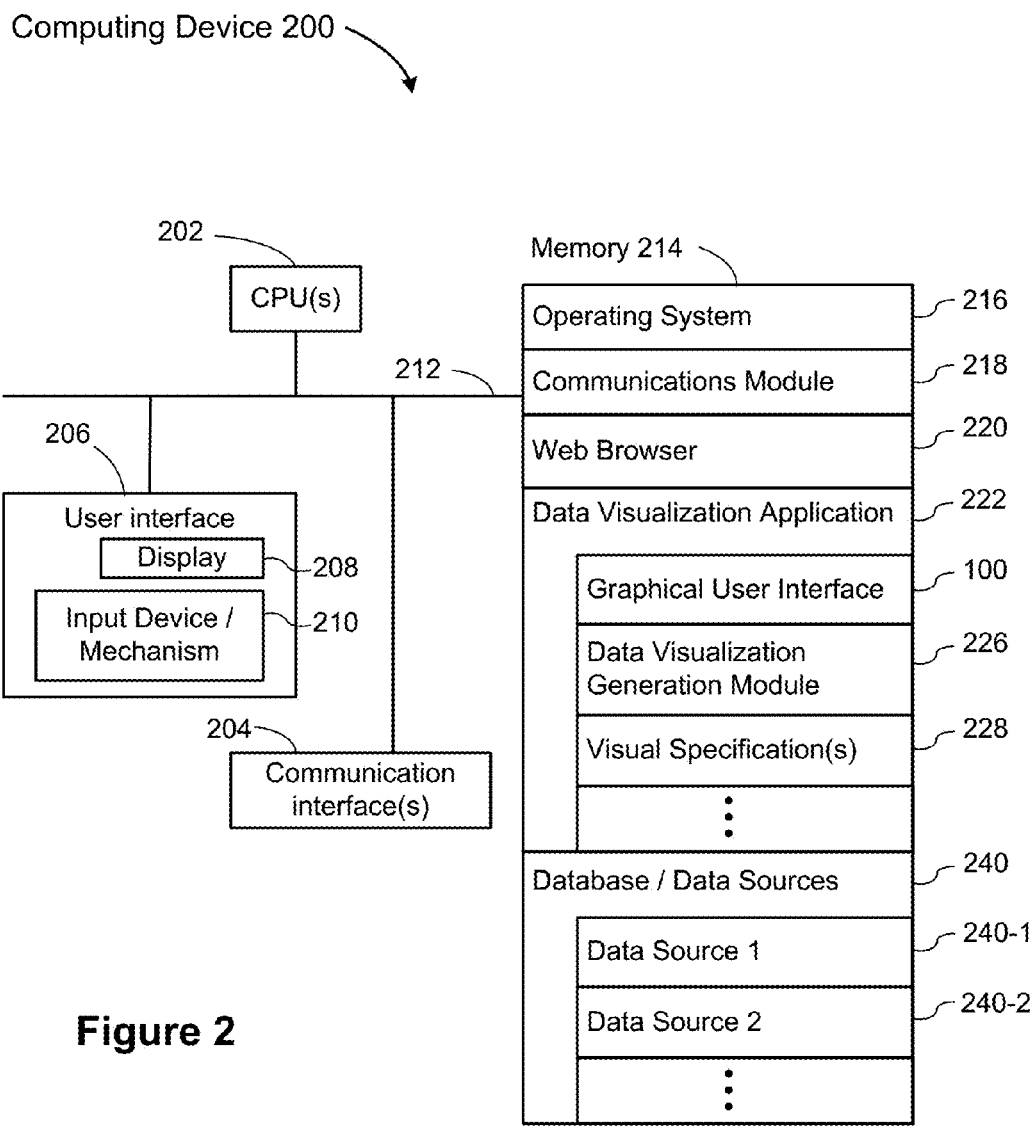
FIG. 2 is a block diagram of a computing device according to some implementations.

FIG. 2 is a block diagram illustrating a computing device 200 that can display the graphical user interface 100 in accordance with some implementations. Computing devices 200 include desktop computers, laptop computers, tablet computers, and other computing devices with a display and a processor capable of running a data visualization application. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display device 208 and one or more input devices or mechanisms 210. In some embodiments, the input device/mechanism includes a keyboard; in some embodiments, the input device/mechanism includes a "soft" keyboard, which is displayed as needed on the display device 208, enabling a user to "press keys" that appear on the display 208. In some embodiments, the display 208 and input device/mechanism 210 comprise a touch screen display (also called a touch sensitive display).

In some embodiments, the memory 214 includes high-speed random access memory, such as DRAM, SRAM, DDR RAM or other random access solid state memory devices. In some embodiments, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some embodiments, the memory 214, or the computer readable storage medium of the memory 214, stores the following programs, modules, and data structures, or a subset thereof:

- an operating system 216 that includes procedures for handling various basic system services and for performing hardware dependent tasks;
- a communications module 218 that is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application) that enables a user to communicate over a network with remote computers or devices;
- a data visualization application 222, which provides a graphical user interface 100 for a user to construct visual graphics. A user selects one or more data sources 240 (which may be stored on the computing device 200 or stored remotely), selects data fields from the data source(s), and uses the selected fields to define a visual graphic.

In some implementations, the information the user provides is stored as a visual specification 228. The data visualization application 222 includes a data visualization generation module 226, which takes the user input (e.g., the visual specification), and generates a corresponding visual graphic. The data visualization application 222 then displays the generated graphic in the user interface 100. In some implementations, the data visualization application 222 executes as a standalone application (e.g., a desktop application). In some implementations, the data visualization application 222 executes within the web browser 220; and

- zero or more databases or data sources 240 (e.g., a first data source 240-1 and a second data source 240-2), which are used by the data visualization application 222. In some implementations, the data sources can be stored as spreadsheet files, CSV files, XML files, flat files, or a relational database.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 214 may store a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the embodiments described herein. In practice, and as recognized by those of ordinary skill in the art, items shown separately could be combined and some items could be separated.

Figure 6:
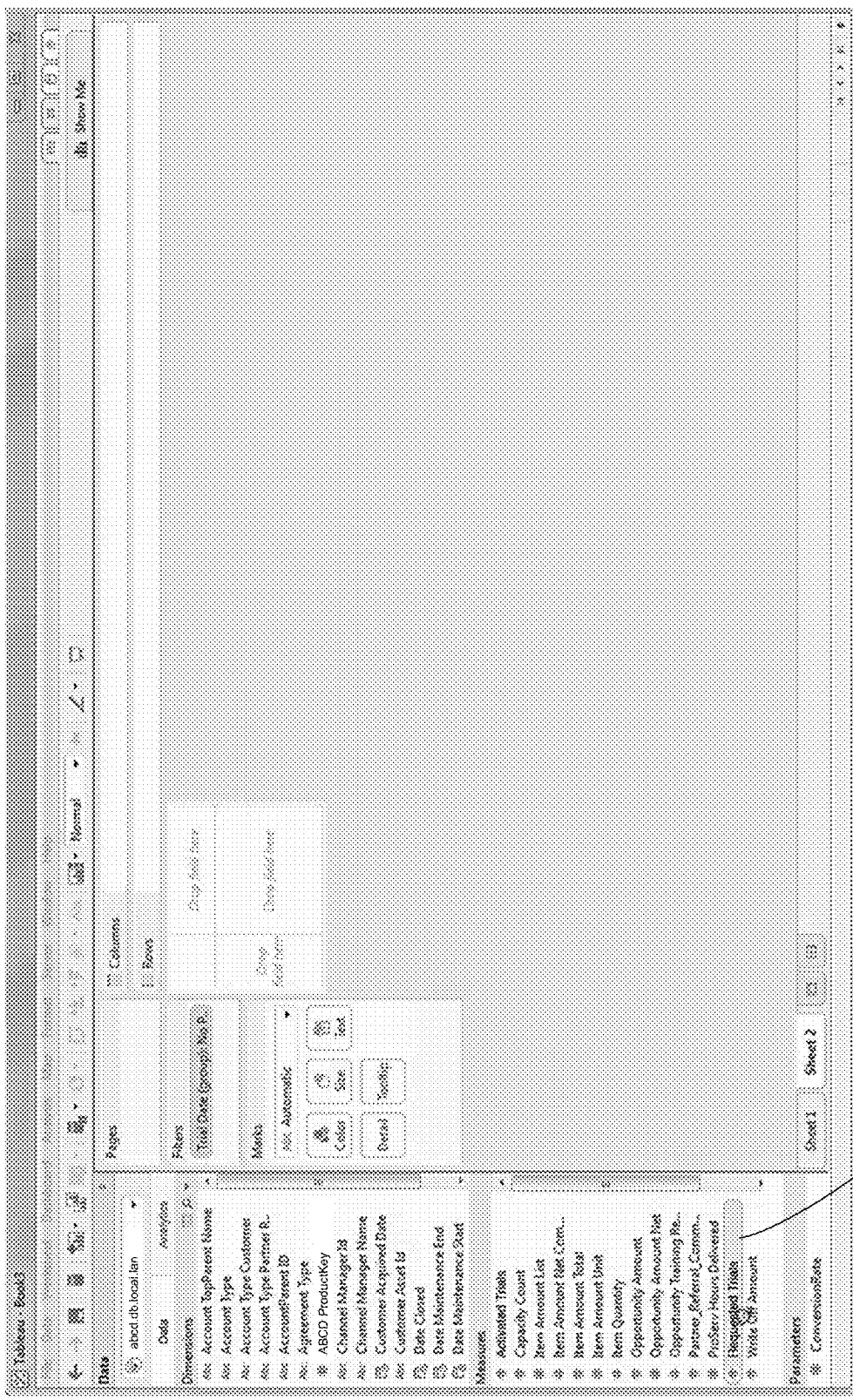
Figure 7:
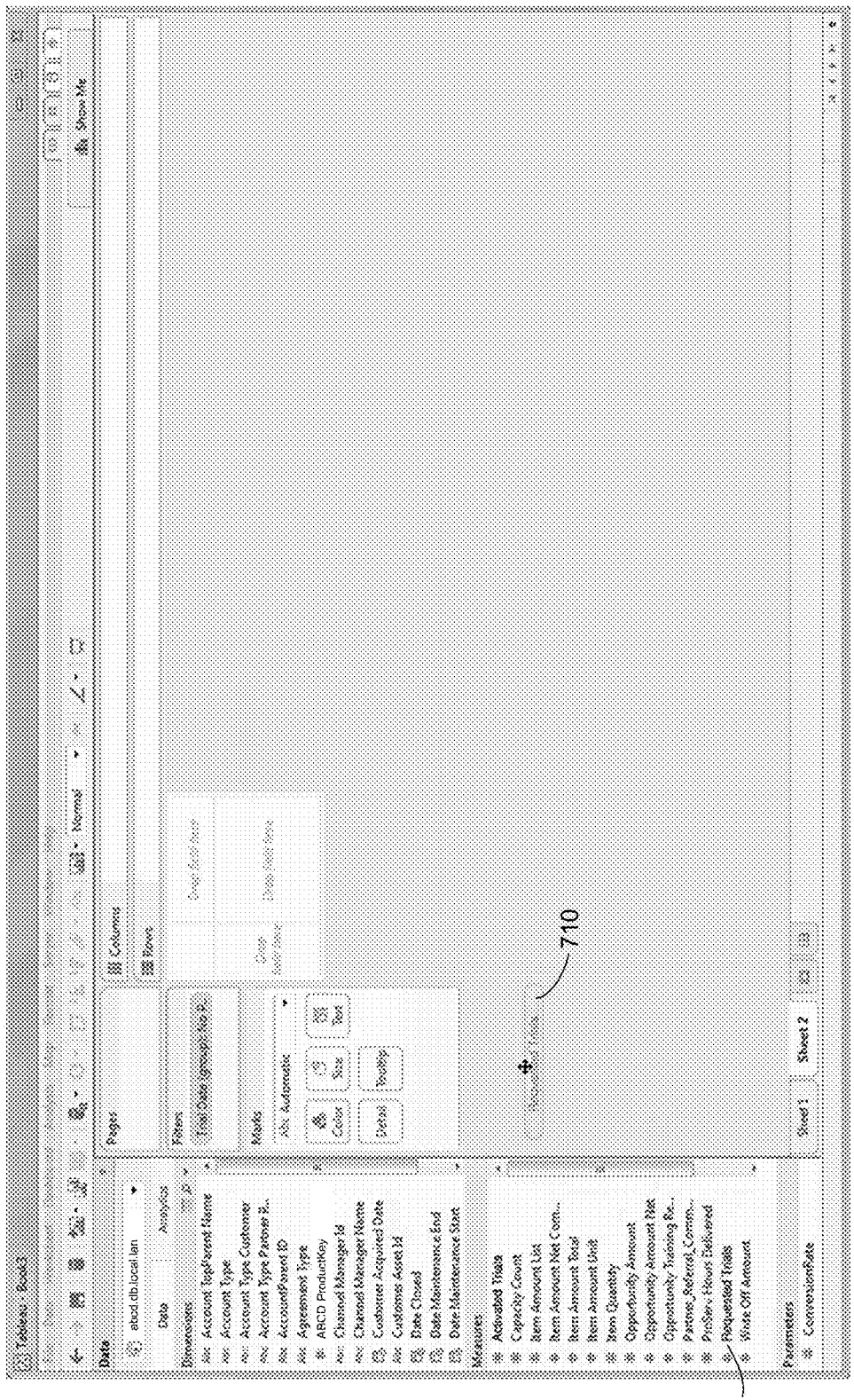

FIGS. 6-30 illustrate various aspects of a user interface 100 according to some implementations. In FIG. 6, a user has selected a specific data element (a field) 610 labeled "Requested Trials." In this implementation, when the data element 610 is selected, it is displayed in a pill-shaped box. FIG. 7 illustrates that the data element instance 710 is being dragged to a shelf. The original data element 712 remains in the schema information region. During the dragging operation, the label "Requested Trials" is visible in the pill 710.

Figure 8:
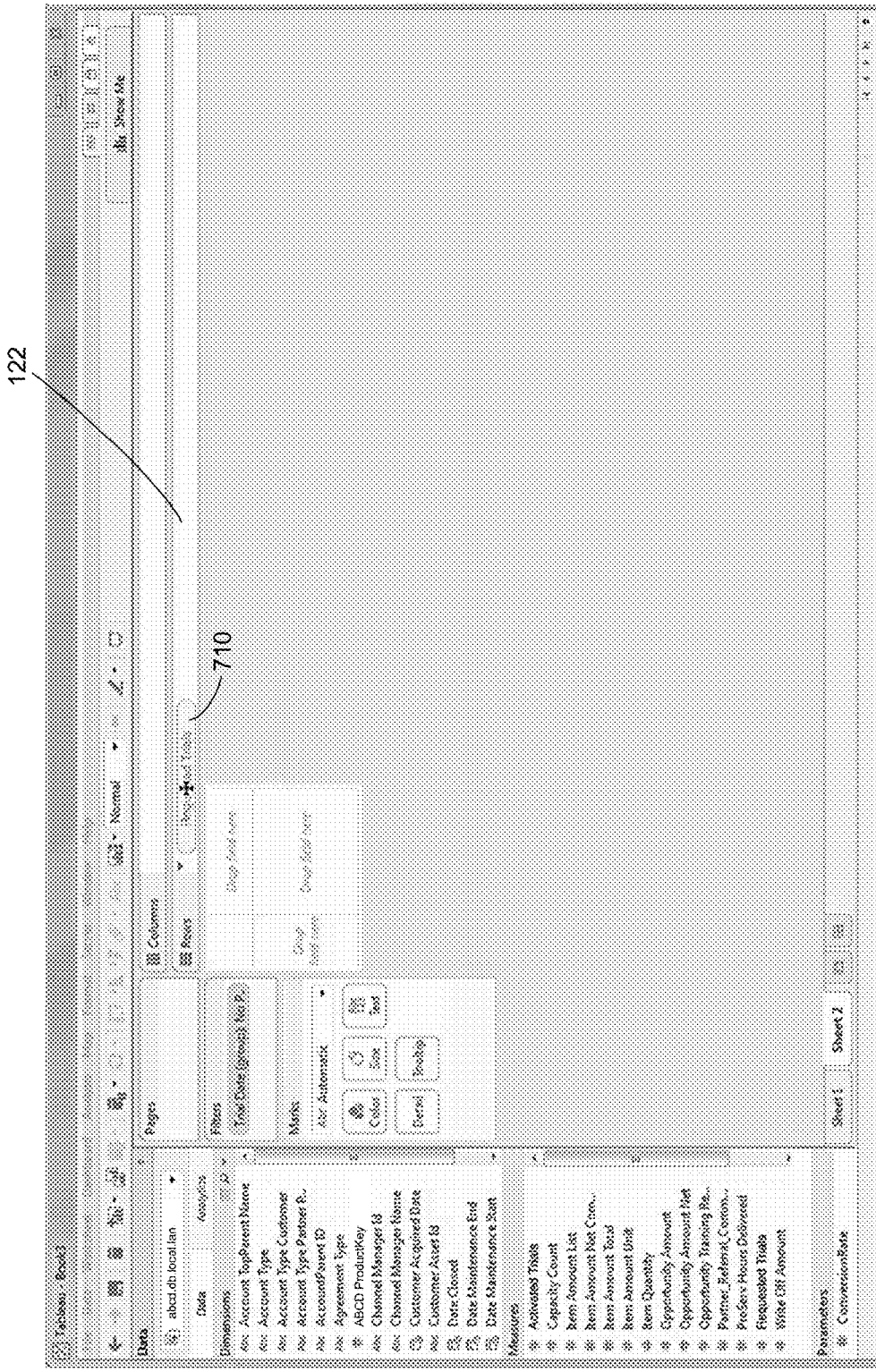
Figure 9:
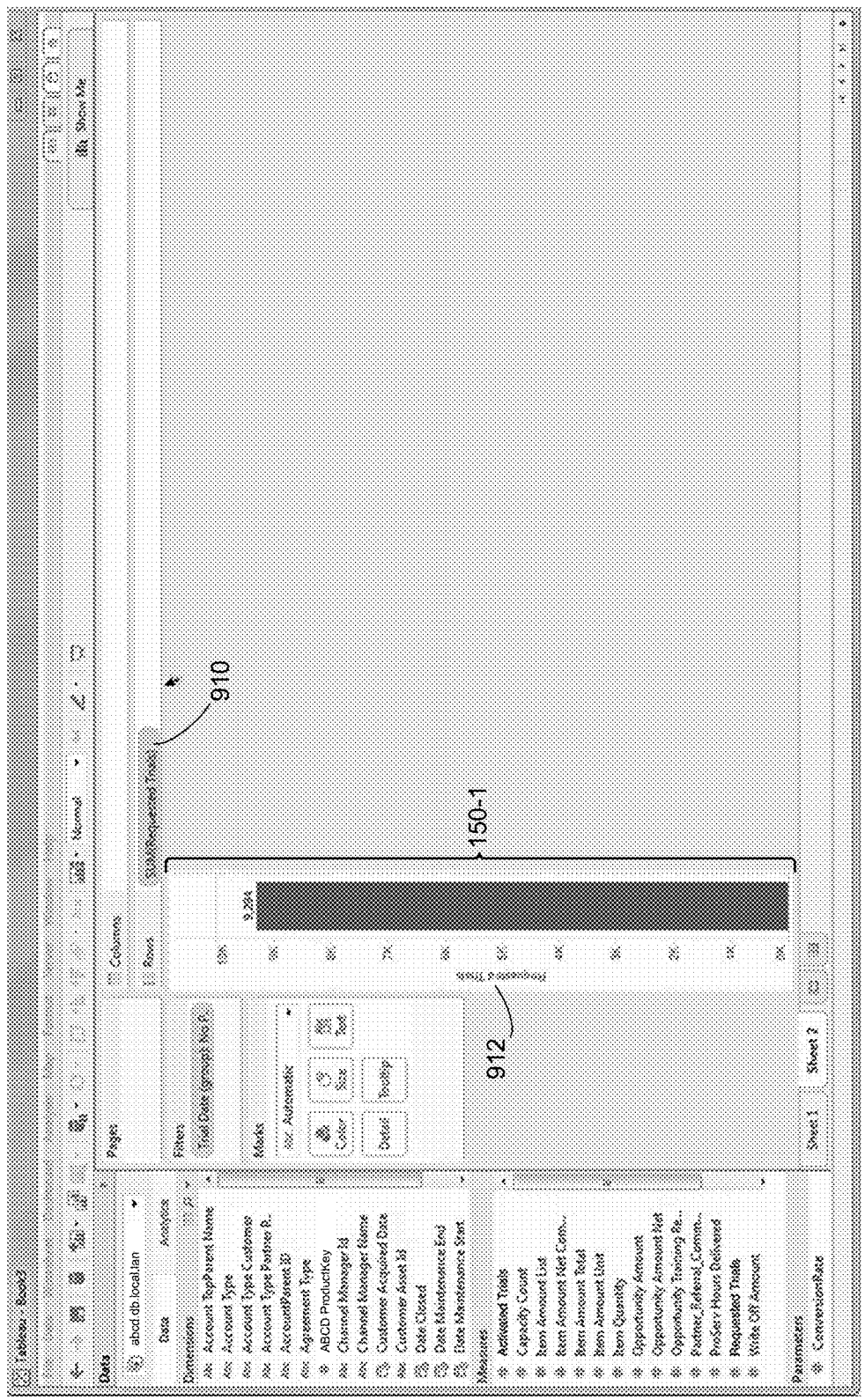
Figure 10:
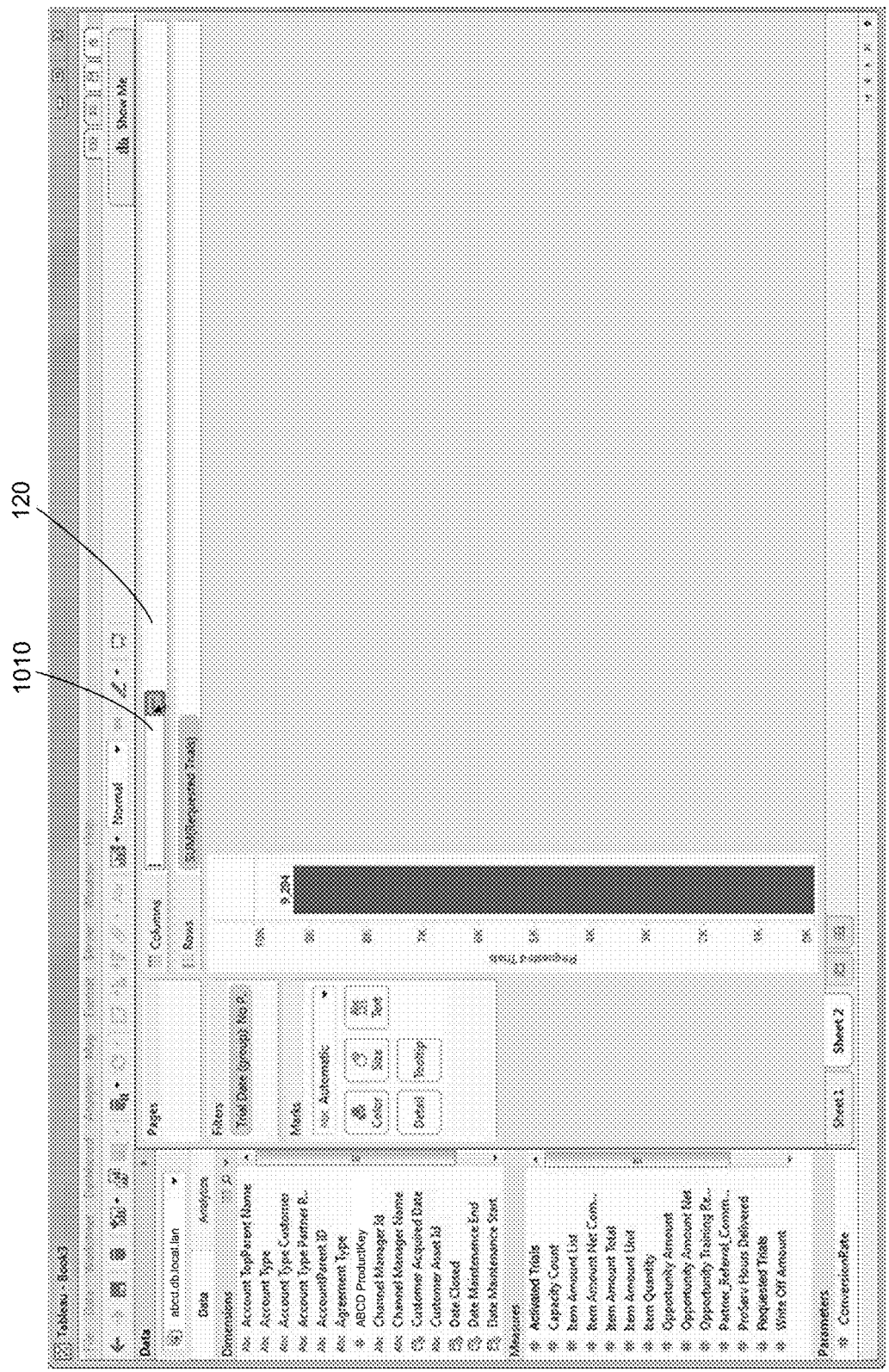

FIG. 8 illustrates that the user has dropped the data element instance 710 into the row shelf region 122. FIG. 9 illustrates that once the data element instance 710 is dropped into the row shelf region, it is used as an aggregate instance SUM(Requested Trials) 910. For this measure, the default action is to use a sum. Now that there is a field name 910 on the row shelf, a first visual graphic 150-1 is displayed. Because there are no data fields on the column shelf 120, all of the data is grouped together to create a single vertical bar. The label 912 identifies the data in the bar.

Figure 11:
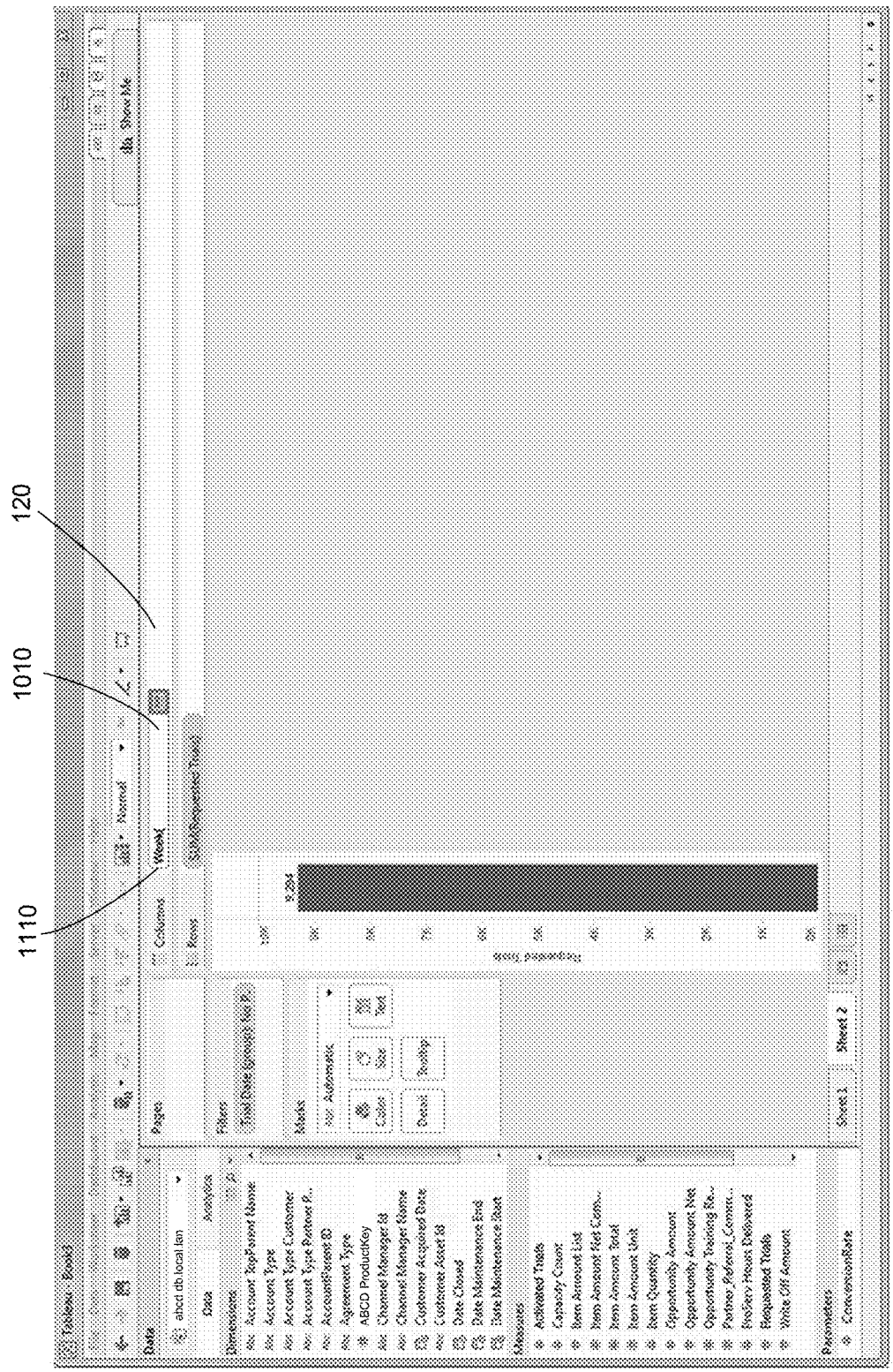
Figure 12:
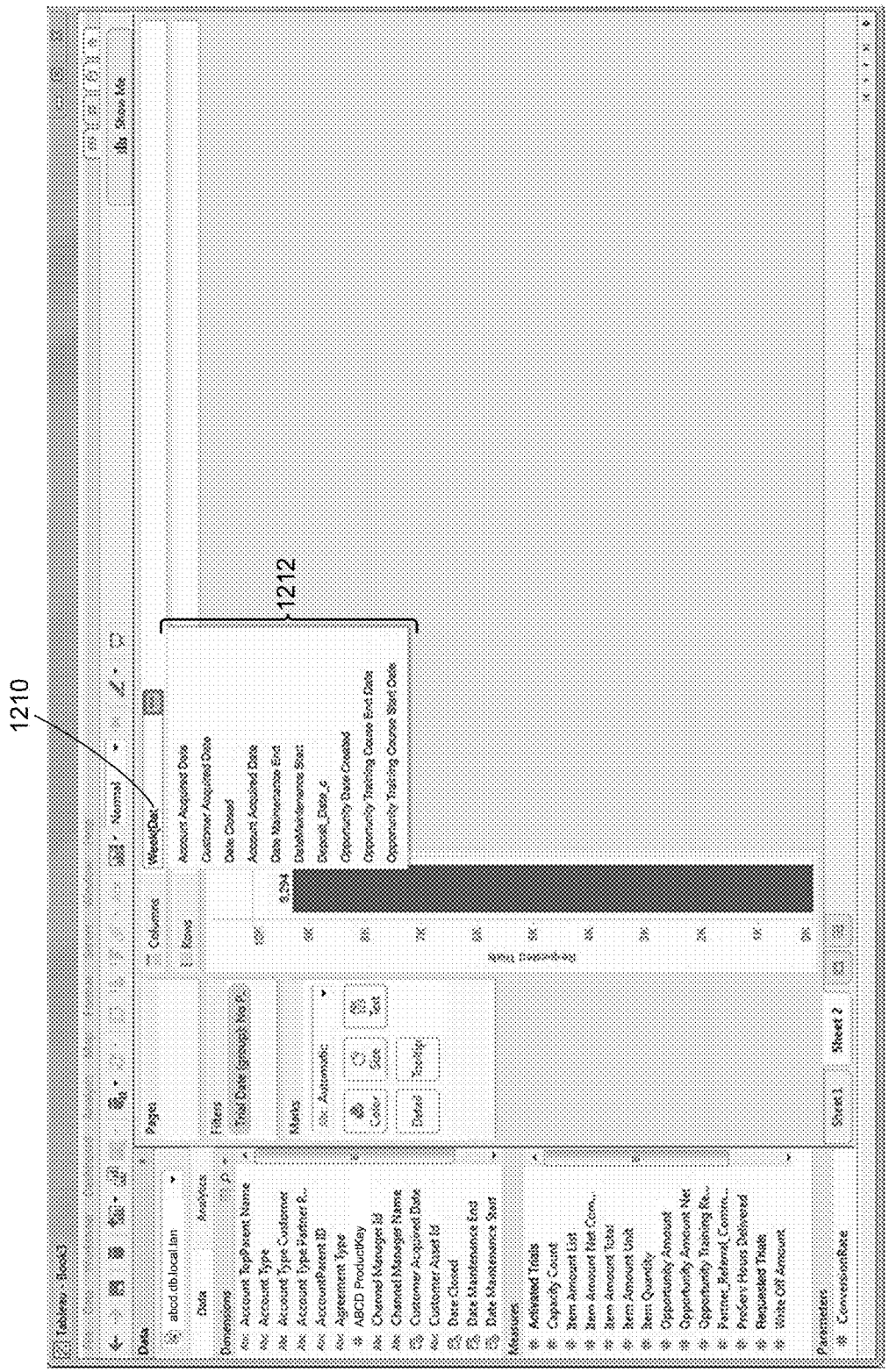
Figure 13:
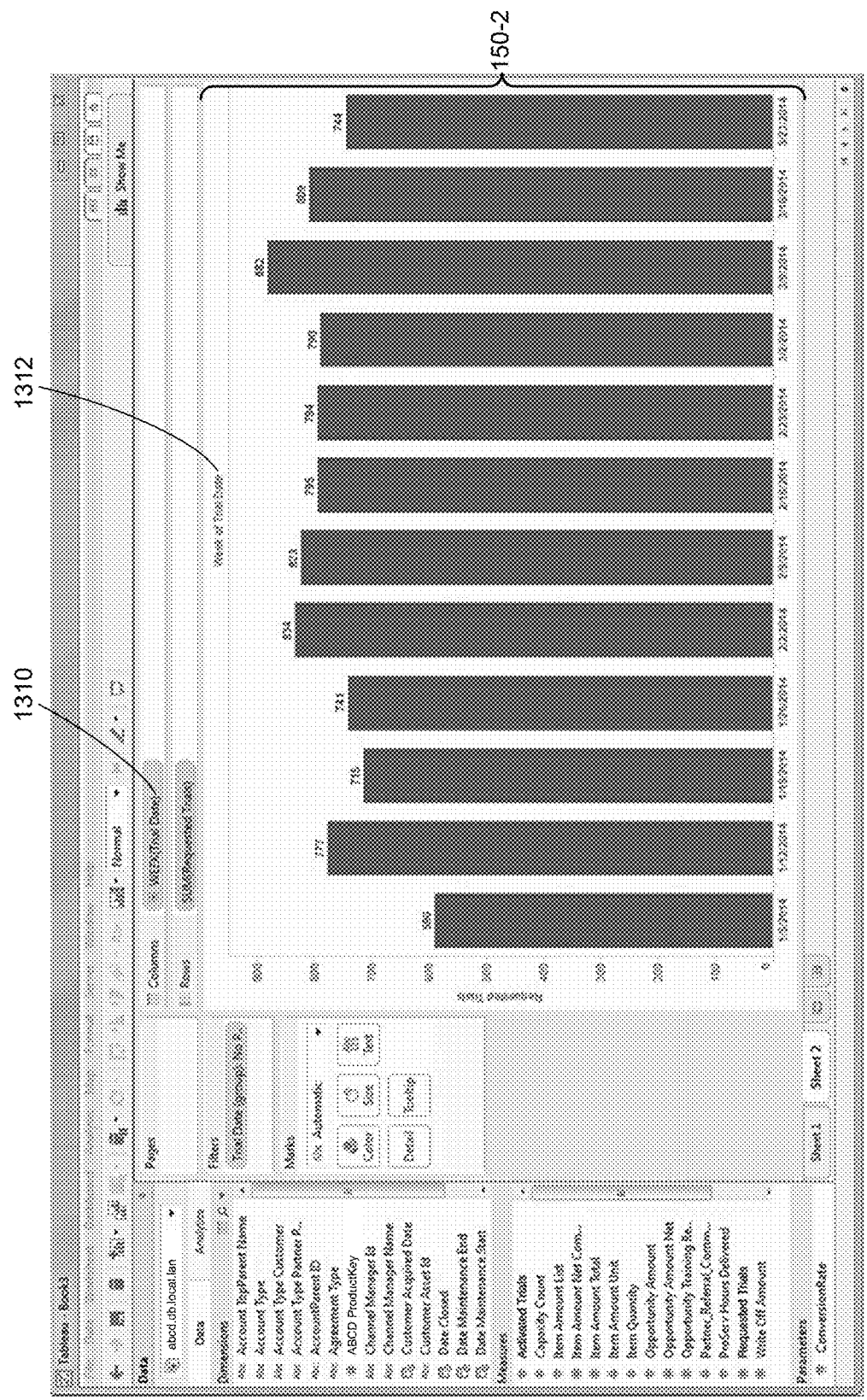

The user then opens a mini-edit control 1010 in the column shelf region 120. In some implementations, the user opens the mini-edit control 1010 by double clicking anywhere within the column shelf region 120. Some implementations open the mini-edit control 1010 by clicking in the column shelf region 120. FIG. 11 illustrates that the user has entered an expression "Week(" 1110 into the mini-edit control 1010. The user wants to enter the name of a date field, but does not remember the name. In FIG. 12, the user starts typing "Dat" 1210 and the user interface displays a list of possible expressions 1212 that have dates. Note that the user interface 100 identifies possible names that include the text string "dat," regardless of where "dat" appears in the expression. The user selects "Date Closed" from the options list 1212, which is displayed as "Trial Date" in FIG. 13. As indicated here, some implementations provide one or more aliases for the same data element. As shown in FIG. 13, the user saves the selection, creating the expression 1310. When saved, a second visual graphic 150-2 is displayed. The "Week( )" function groups the data together by week, and thus the second visual graphic 150-2 includes a separate bar for each week. The Week( ) function is sometimes referred to as a binning function because it groups together data records into bins. (The functions Month( ), Quarter( ), and Year( ) operate similarly.) Because the expression just applies a binning function to a data element in the data pane 110, it is saved as a reference to the data element "Trial Date" rather than as an ad hoc calculation. Based on the formula for the ad hoc expression 1310, the horizontal graph label 1312 indicates "Week of Trial Date." In some implementations, the horizontal label is displayed below the bars.

Figure 14:
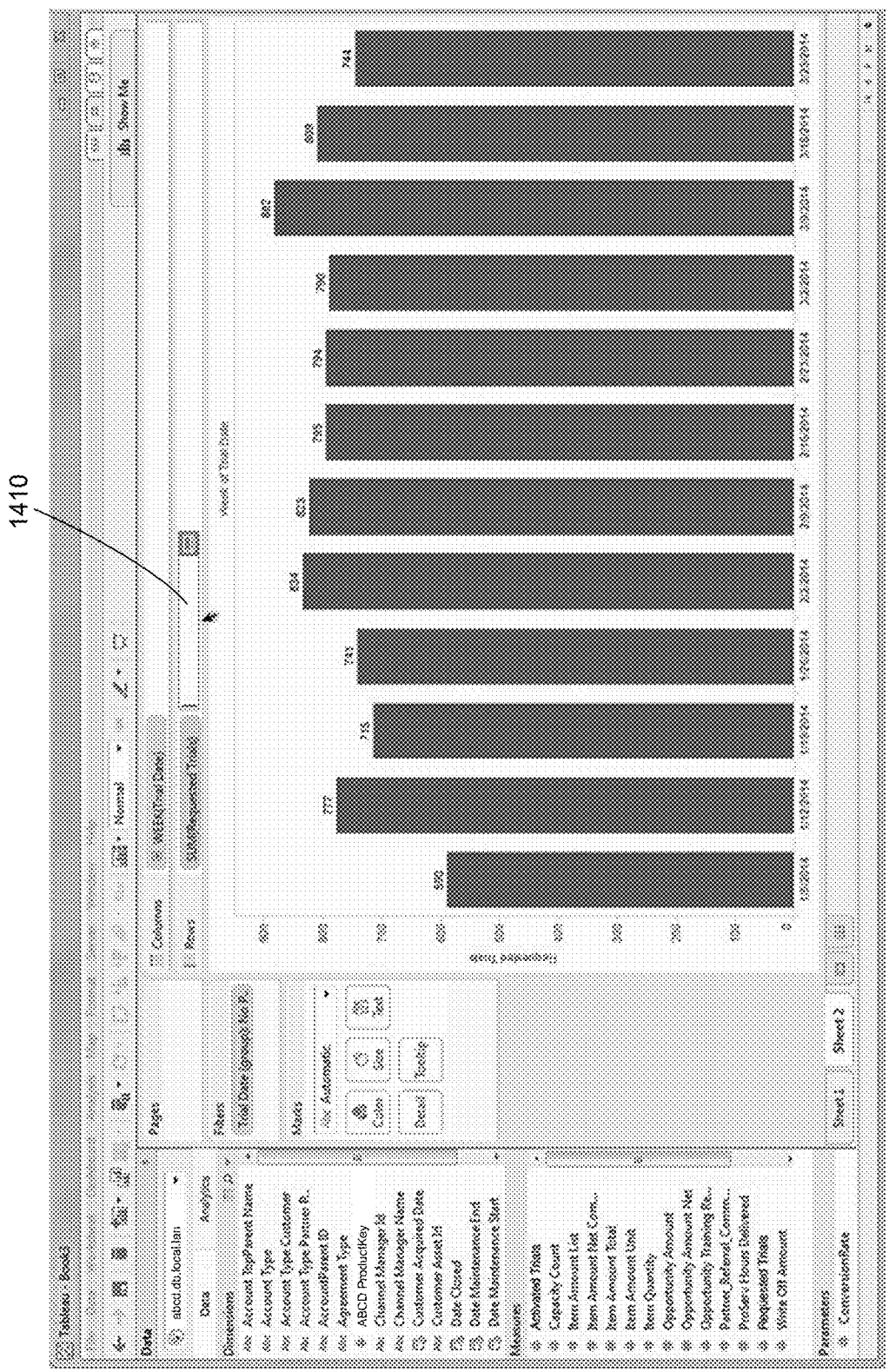

In FIG. 14, the user has created a new box/pill 1410 in the row shelf region 122. The user can edit the pill in various ways: typing into the pill, pasting text into the pill that has been copied from another location, dragging and dropping a data element from the schema information region 110, dragging a text string from another user interface object, or dragging another user interface object. When dragging an entire object into a pill, a formula or expression corresponding to the object is copied into the pill.

Figure 15:
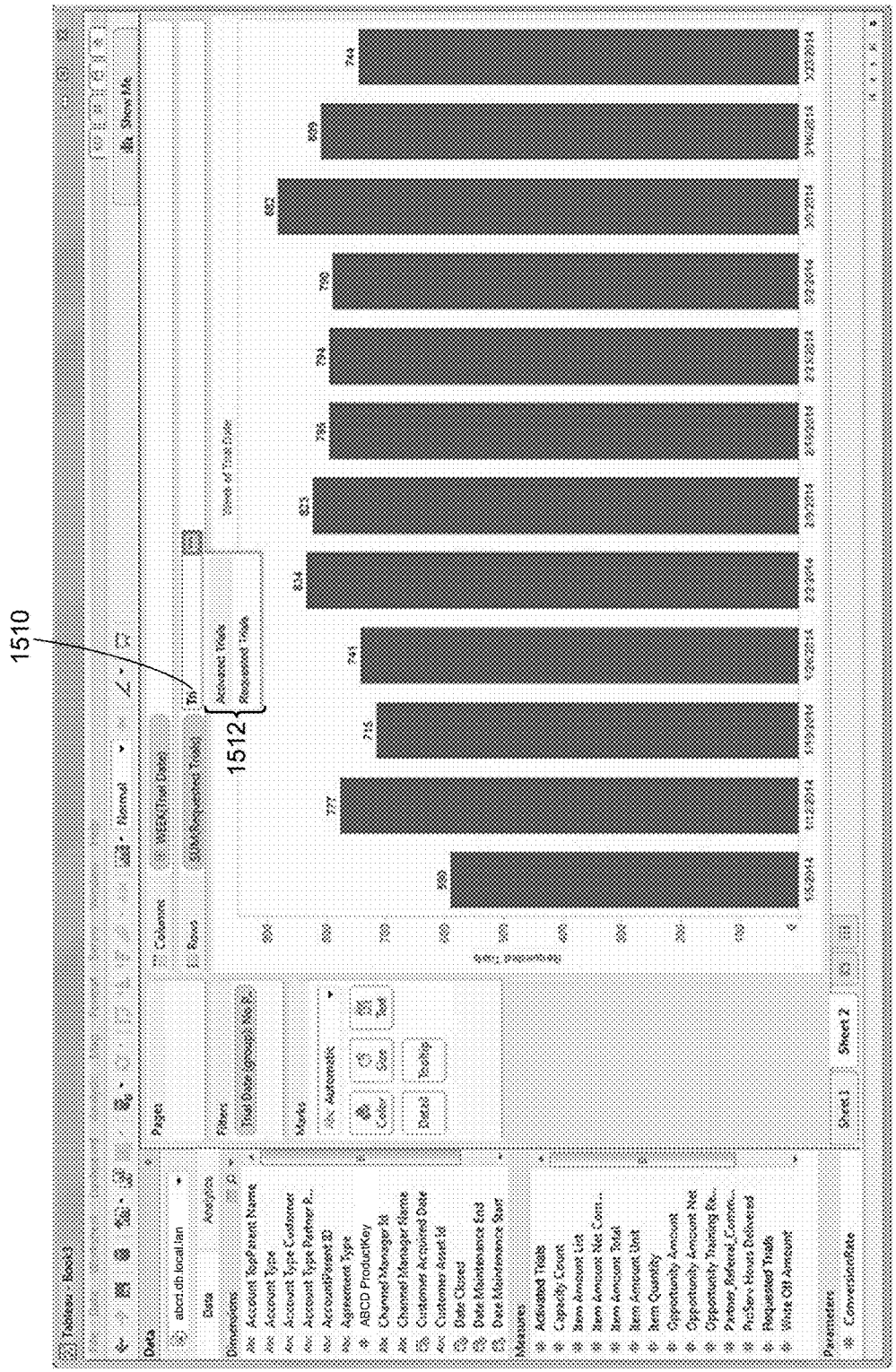
Figure 16:
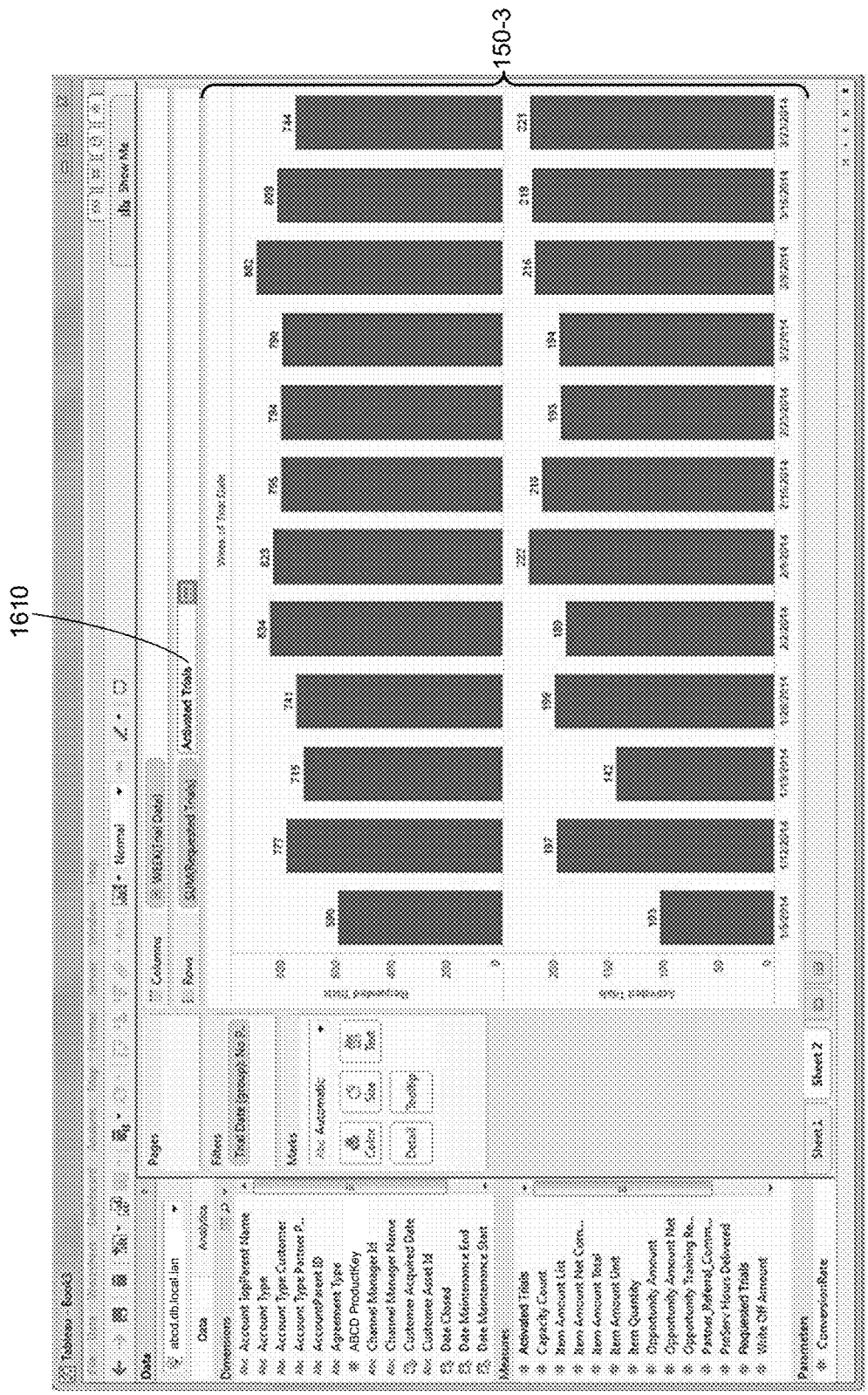
Figure 17:
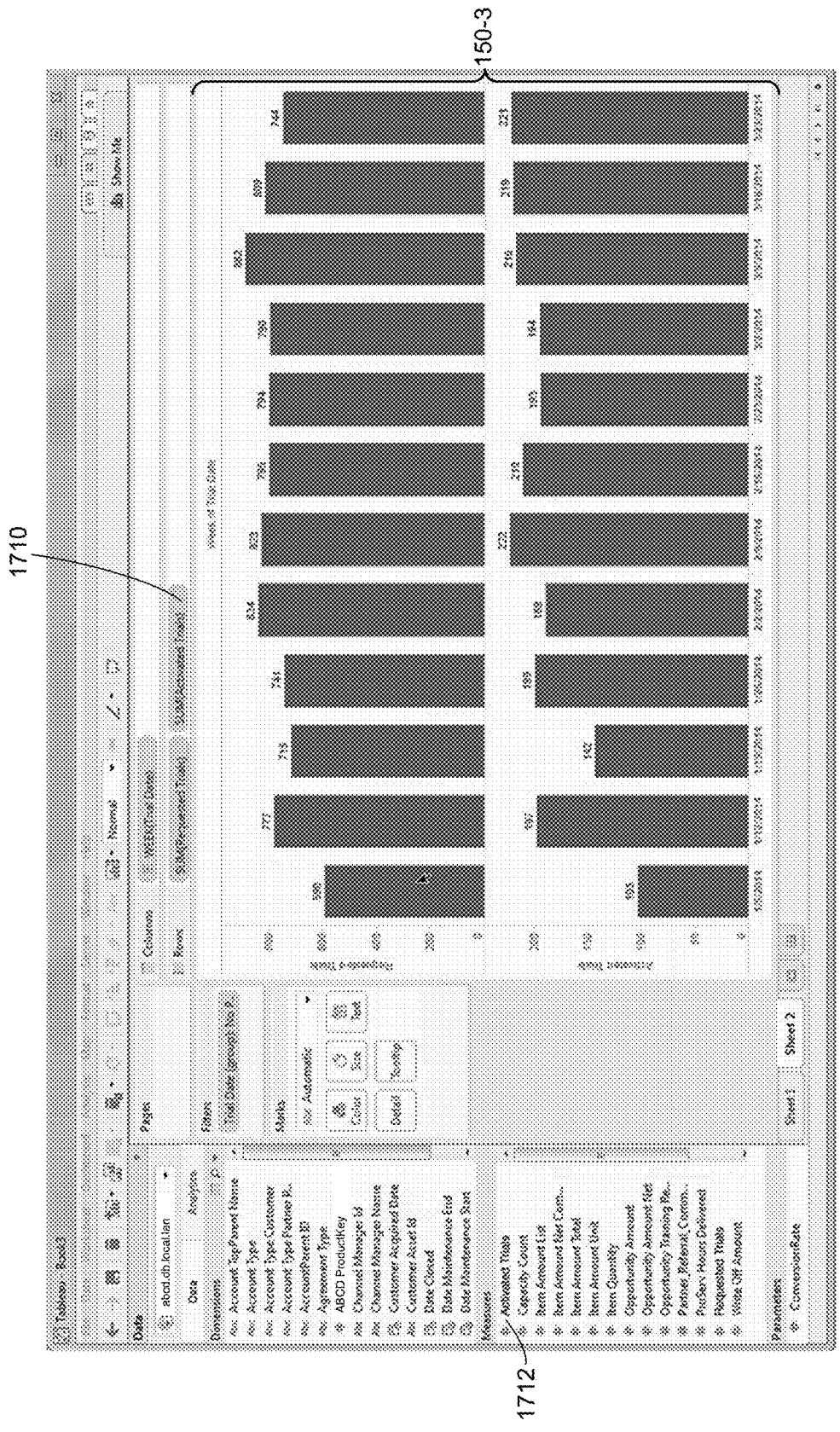

As illustrated in FIG. 15, the user wants another field that deals with trials, and thus begins typing "Tri" 1510. The user interface 100 provides a list 1512 of data fields that include the text string "tri." The user selects "Activated Trials" 1610, then applies the selection. In some implementations, a user can apply an ad hoc expression without closing it using CTRL+ENTER. Other implementations use alternative keyboard commands. Once the ad hoc calculation is applied, the user interface 100 displays a third visual graphic 150-3 in the data visualization region. Here there is a row of bars for Requested Trials and another row of bars for Activated Trials. Because Activated Trials is a measure, the data is summed by default, even though "SUM" does not appear in the formula 1610. When the user closes the editing, the aggregated expression "SUM(Activated Trials)" 1710 is displayed, corresponding to the same visual graphic 150-3. This is shown in FIG. 17. Even though the expression 1710 was creating through an editing process, it corresponds to the "Activated Trials" field 1712 in the schema information region (an aggregated instance), and thus the expression is saved as a reference to the "Activated Trials" field 1712 rather than an ad hoc calculation.

Figure 18:
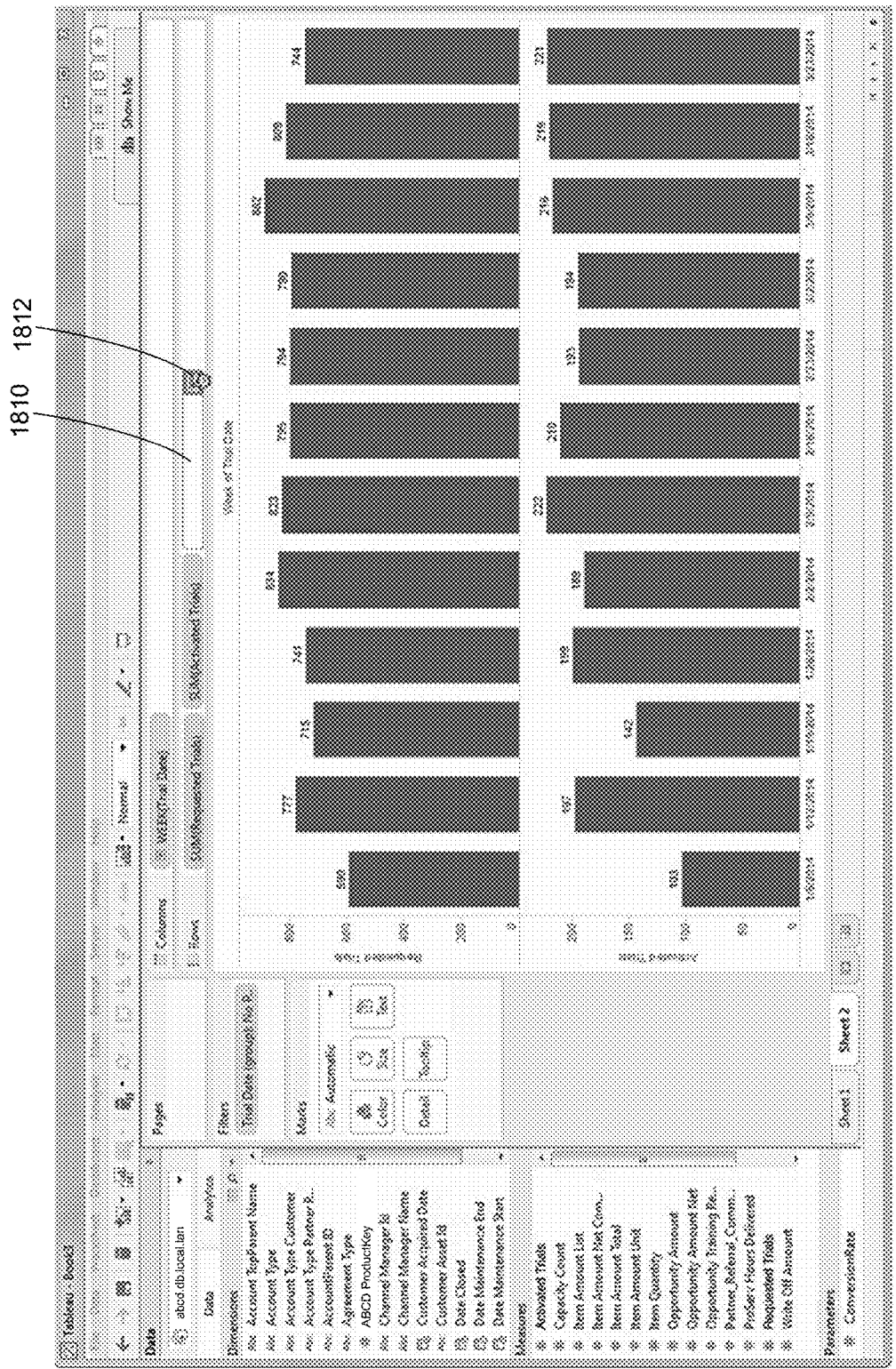
Figure 19:
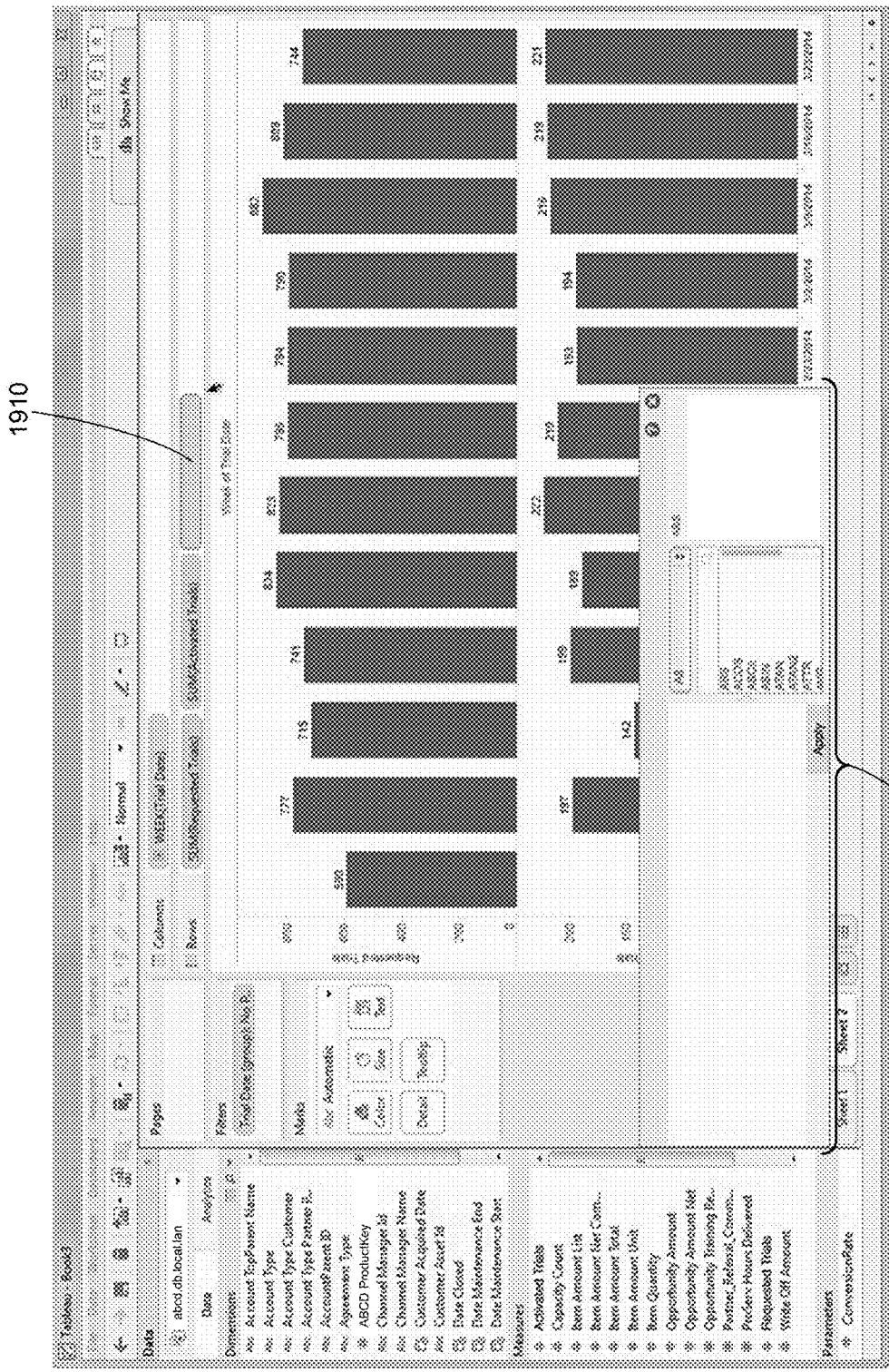

In FIG. 18, the user has created a third pill 1810 in the row shelf region 122. Instead of editing directly in the pill itself, the user clicks on the editor icon 1812 to bring up the calculation edit window 1912 illustrated in FIG. 19. Typically this is a non-modal calculation edit window, and thus text or other objects can be copied out of the window 1912 or into the window 1912. While the calculation edit window 1912 is open, the corresponding pill is shown in a blank state 1910. In some implementations, the expression in the calculation edit window 1912 is displayed in the pill instead of being blank.

Figure 20:
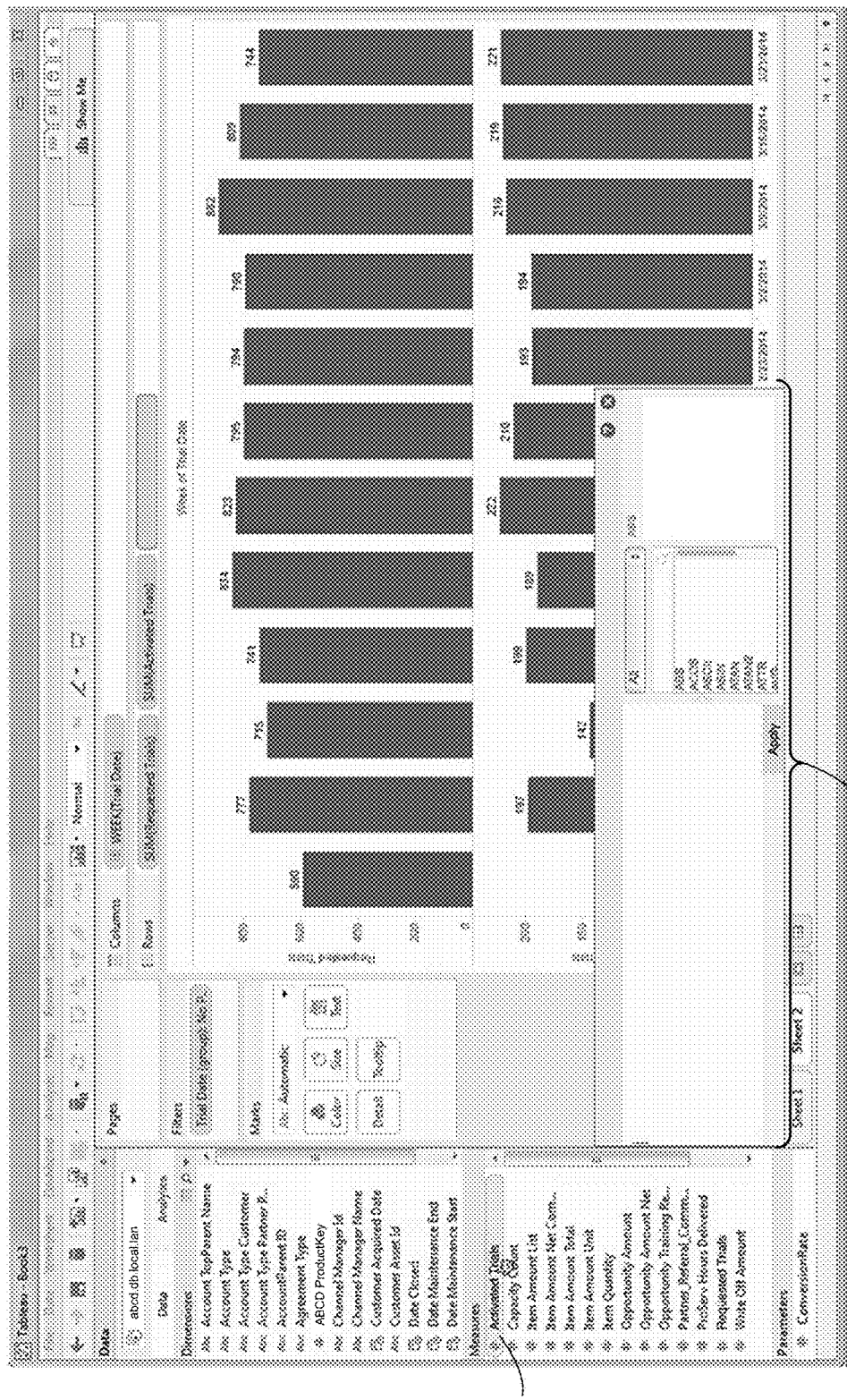
Figure 21:
Figure 22:
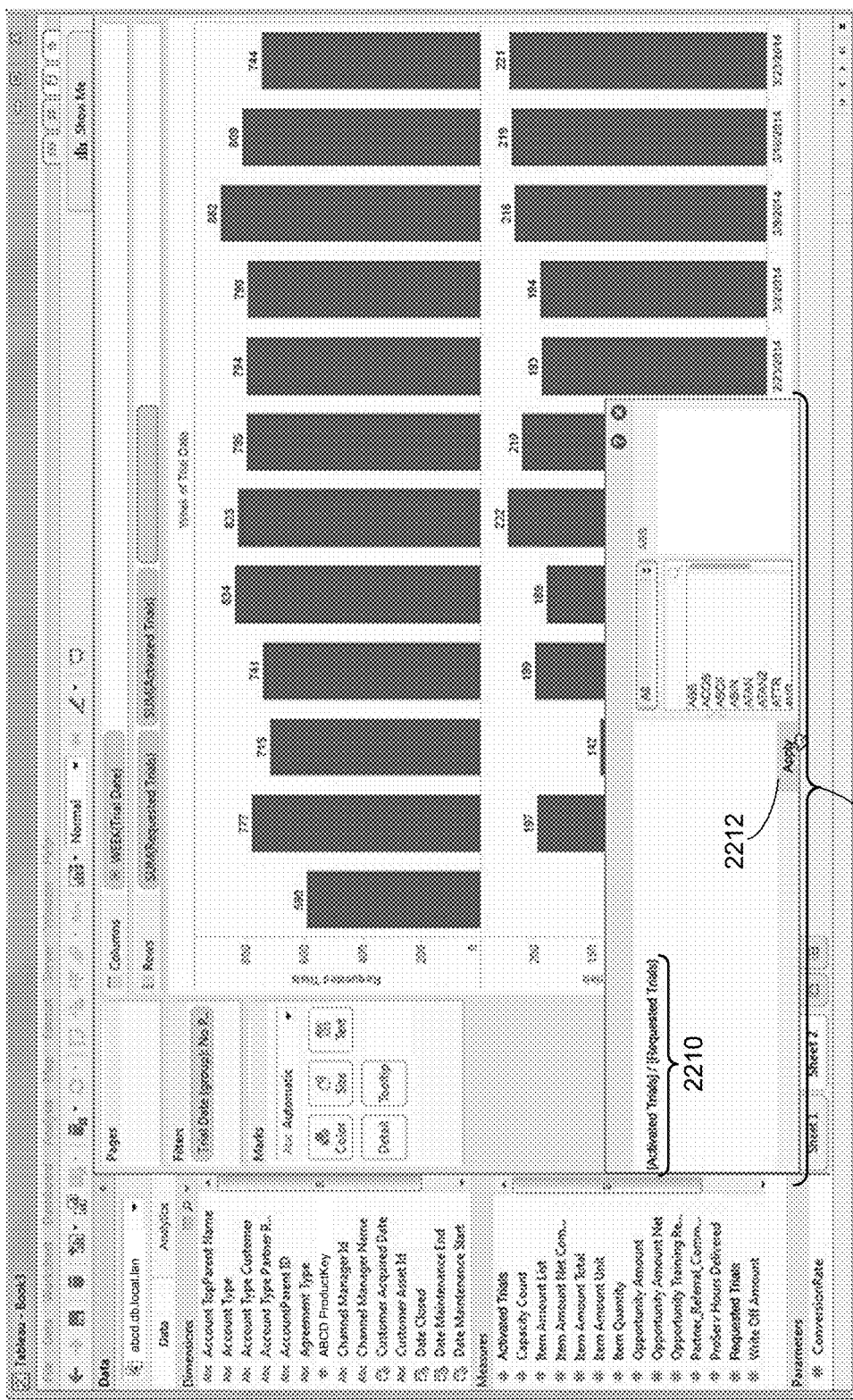

FIG. 20 illustrates that while the calculation edit window 1912 is open, the user can select a data element, such as the selected pill 2010 for Activated Trials. FIG. 21 illustrates that the user is dragging the instance 2110 of "Activated Trials" into the edit region 2112 of the calculation edit window 1912. After the user drops the "Activated Trials" pill 2110 into the edit region 2112, the user types in "/" to indicate division, then drags a pill for "Requested Trials" into the edit region 2112 as well, creating the expression [Activated Trials]/[Requested Trials] 2210. This is illustrated in FIG. 22. In this case, the square brackets are useful to clarify that "Activated Trials" is a single data element and not two distinct data elements.

Figure 23:
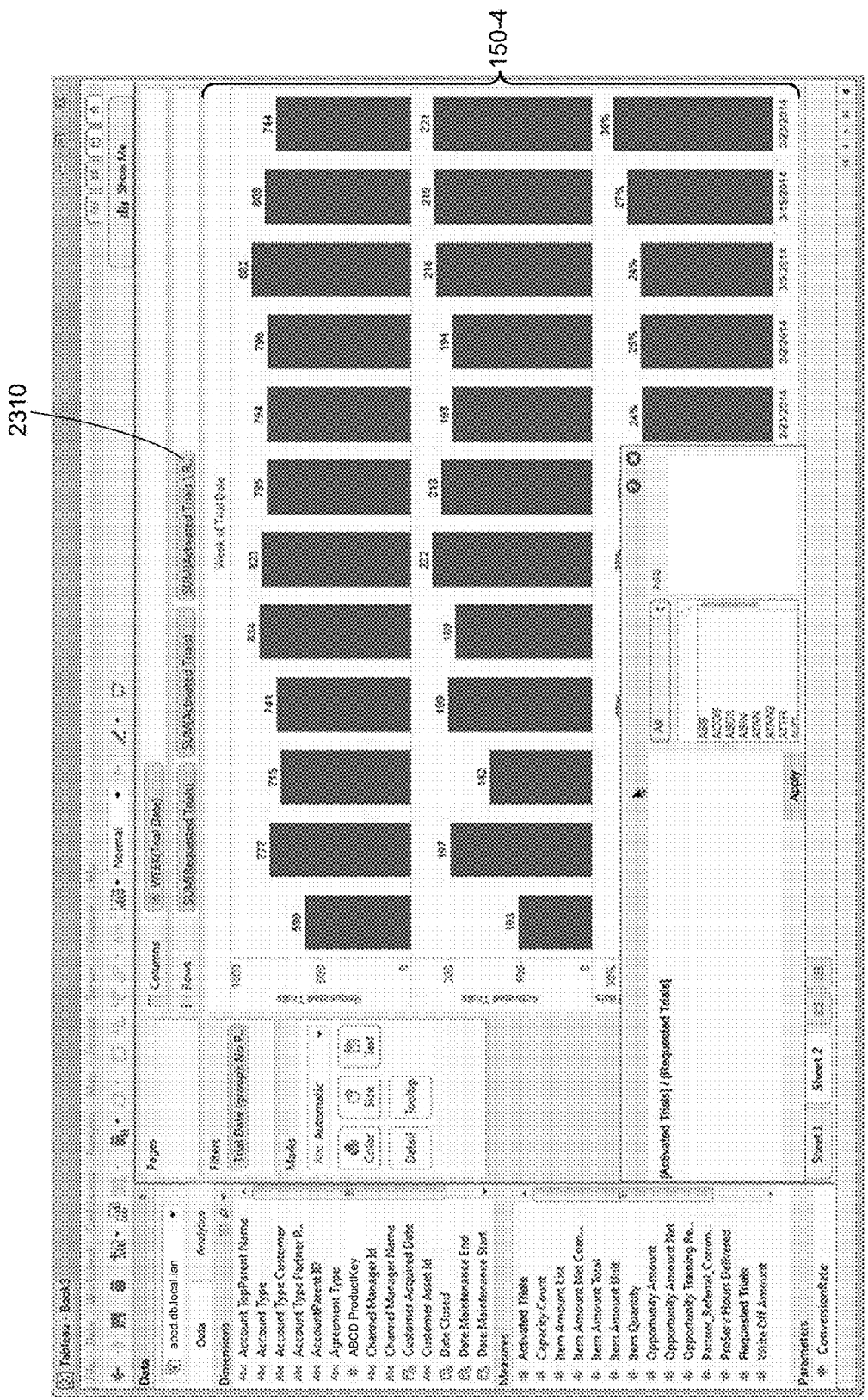

The user clicks the Apply button 2212, and a fourth visual graphic 150-4 is displayed, as illustrated in FIG. 23. The row shelf region 122 now shows an ad hoc pill 2310 corresponding to the saved calculation. In this example, a portion of the calculation expression is shown in the ad hoc pill 2310, with an ellipsis to indicate there is more. Note that the division is shown with a backslash "\" rather than a forward slash "/" to indicate integer division (e.g., the division will be rounded to the nearest integer percentage). If the user does not want to make any additional changes to the expression, the calculation edit window 1912 can be closed, as illustrated in FIG. 24.

Figure 24:
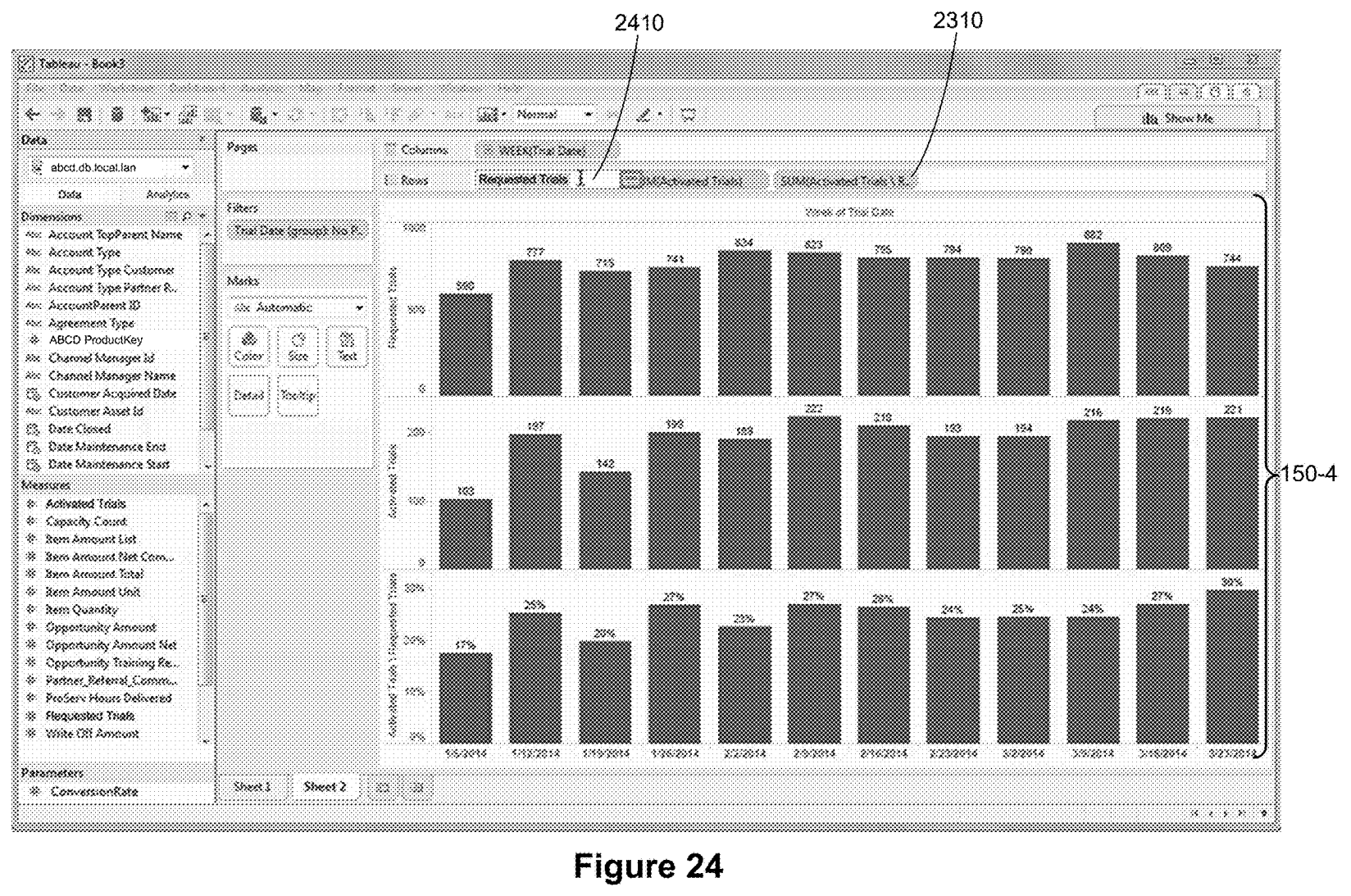
Figure 25:
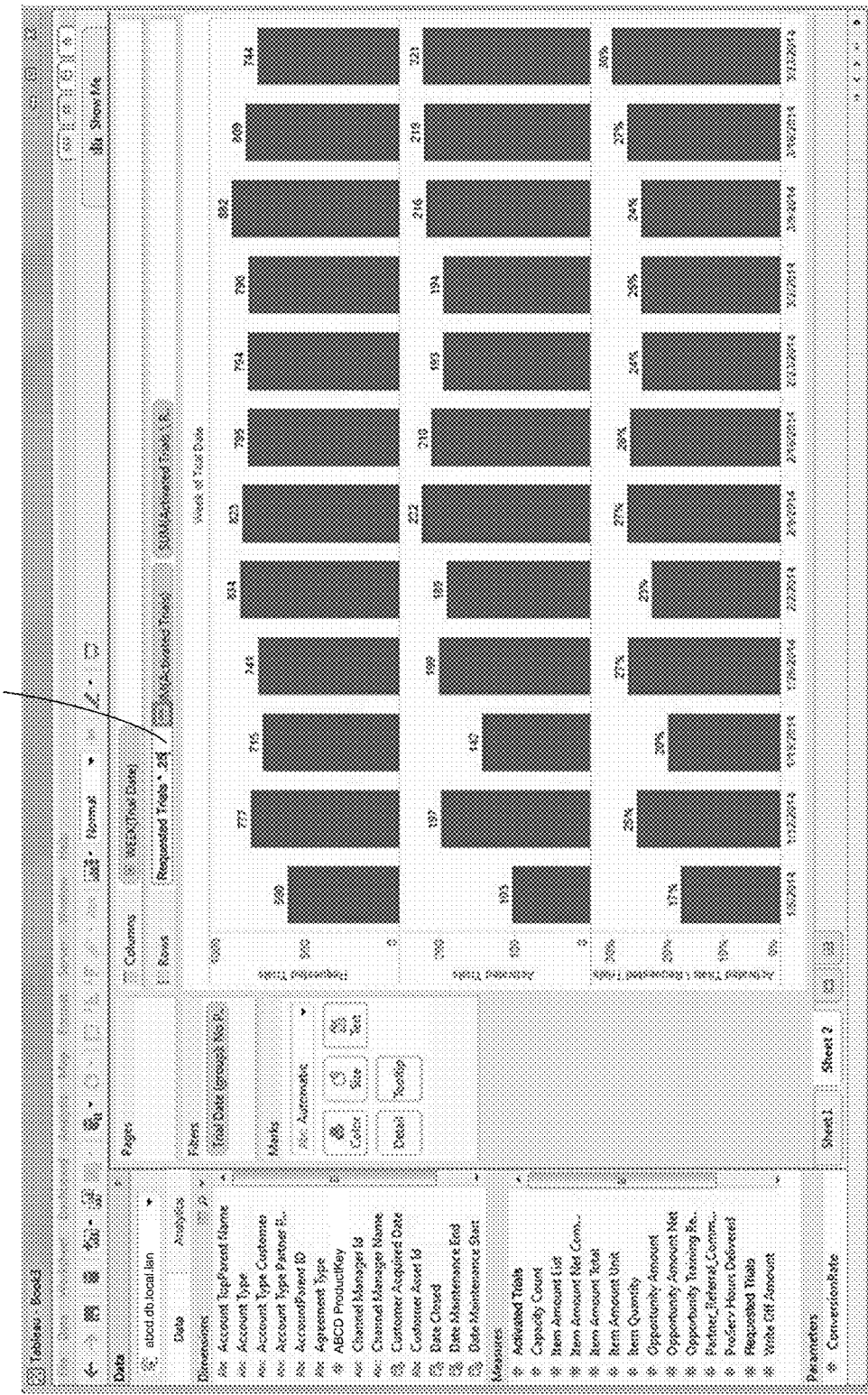

In FIG. 24, the user decides to edit the expression for the first pill 2410 in the row shelf region 122. In some implementations, this is accomplished by clicking anywhere inside the pill 2410. The user edits the expression by multiplying by 0.25 to get the updated pill 2510, as illustrated in FIG. 25. This may be used to see what it would look like if 25% of the requested trials were activated.

Figure 26:
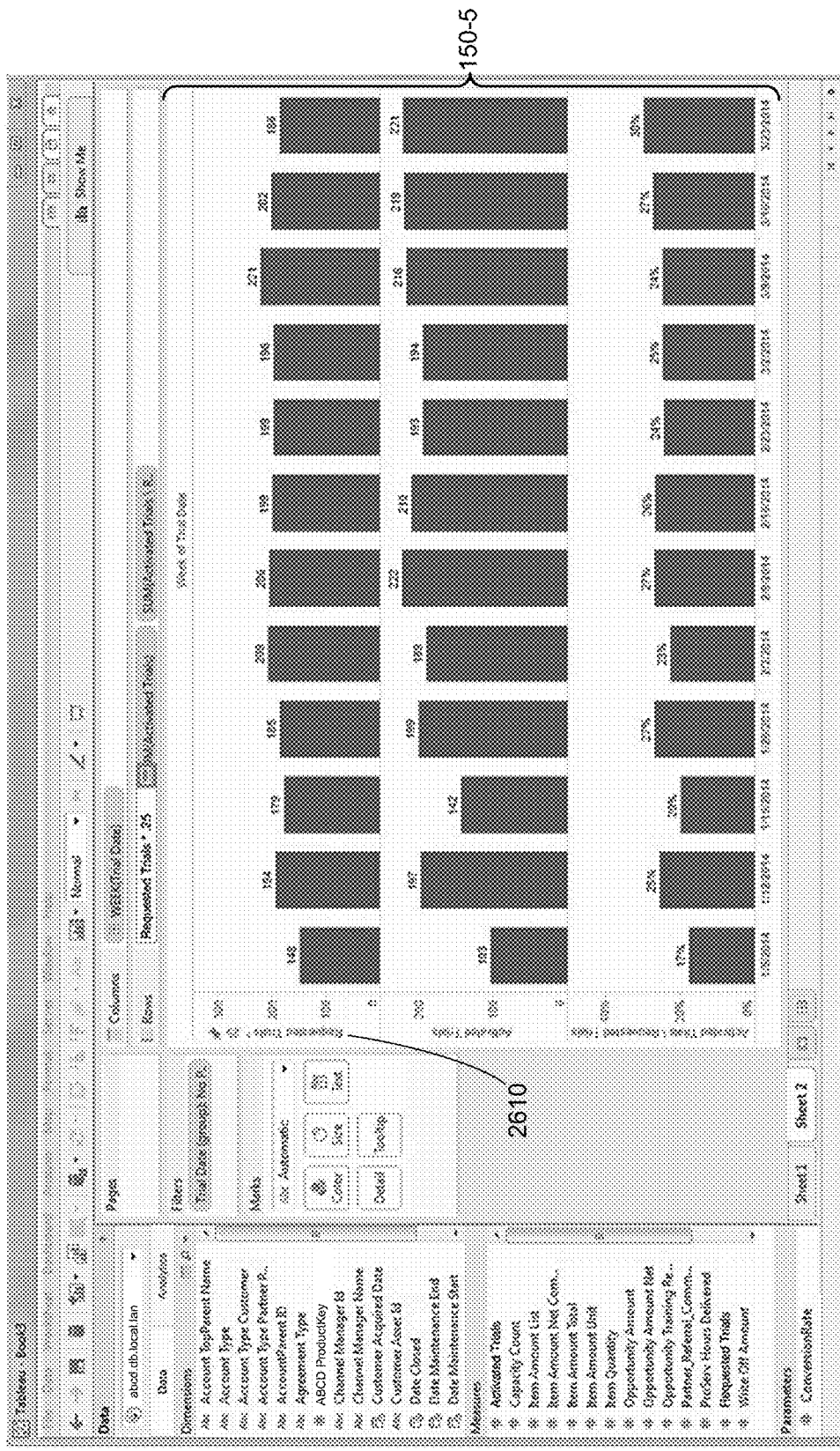
Figure 28:
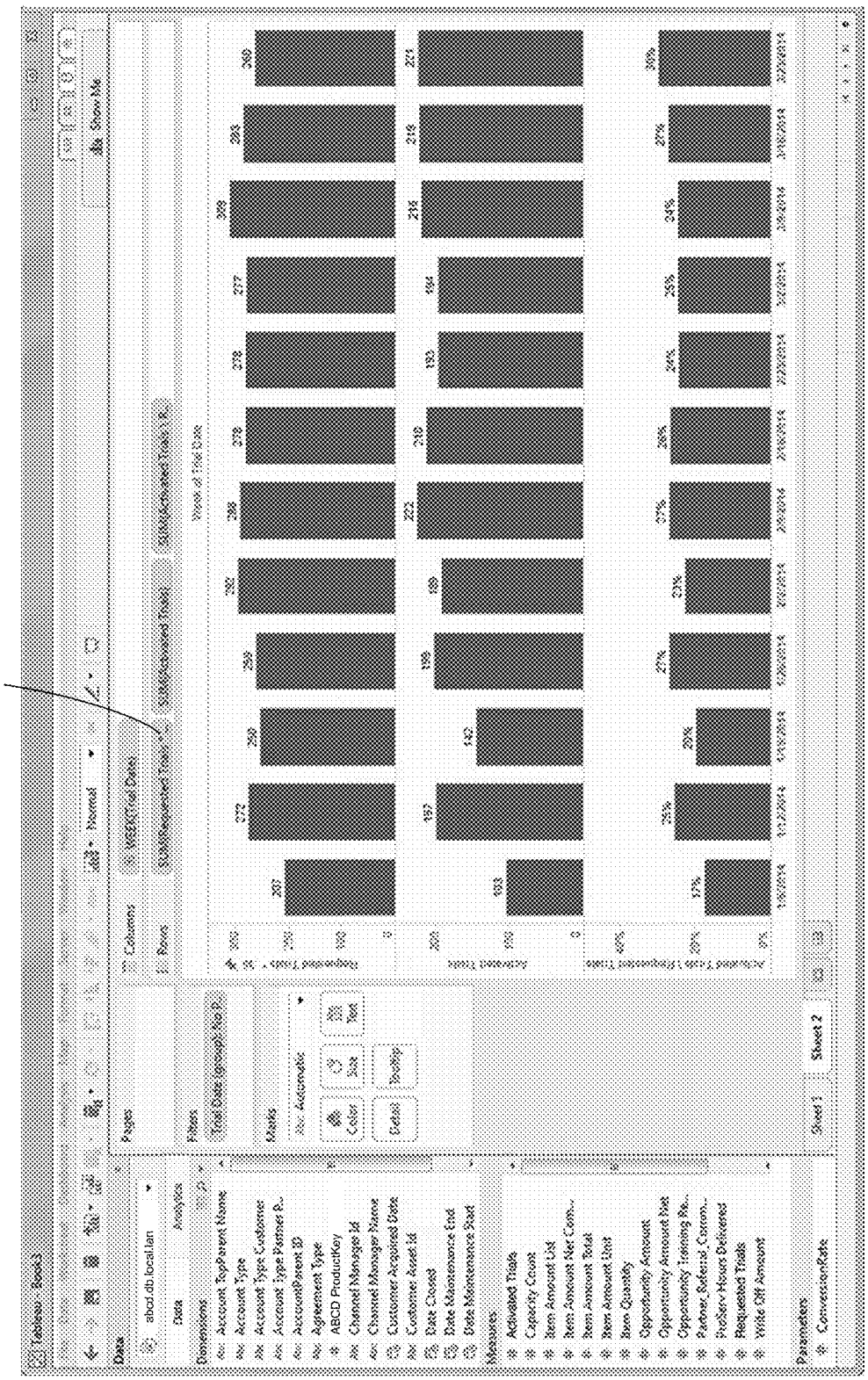

In FIG. 26, the user has applied the new formula, creating a fifth visual graphic 150-5. The top label 2610 indicates the expression used to compute the height of the bars in the top row. The user decides that a 25% conversion rate is not high enough, and thus tries 35%, as indicated by the formula 2710. Applying the new formula results in a sixth visual graphic 150-6, and the top label 2712 shows the revised formula. In FIG. 28, the user closes the editing of the first pill. The expression 2810 for the first pill is truncated, which is indicated by the ellipsis. In this case, the editing of the first pill in the row shelf region 122 has converted it from a standard reference to an ad hoc calculation.

Figure 29:
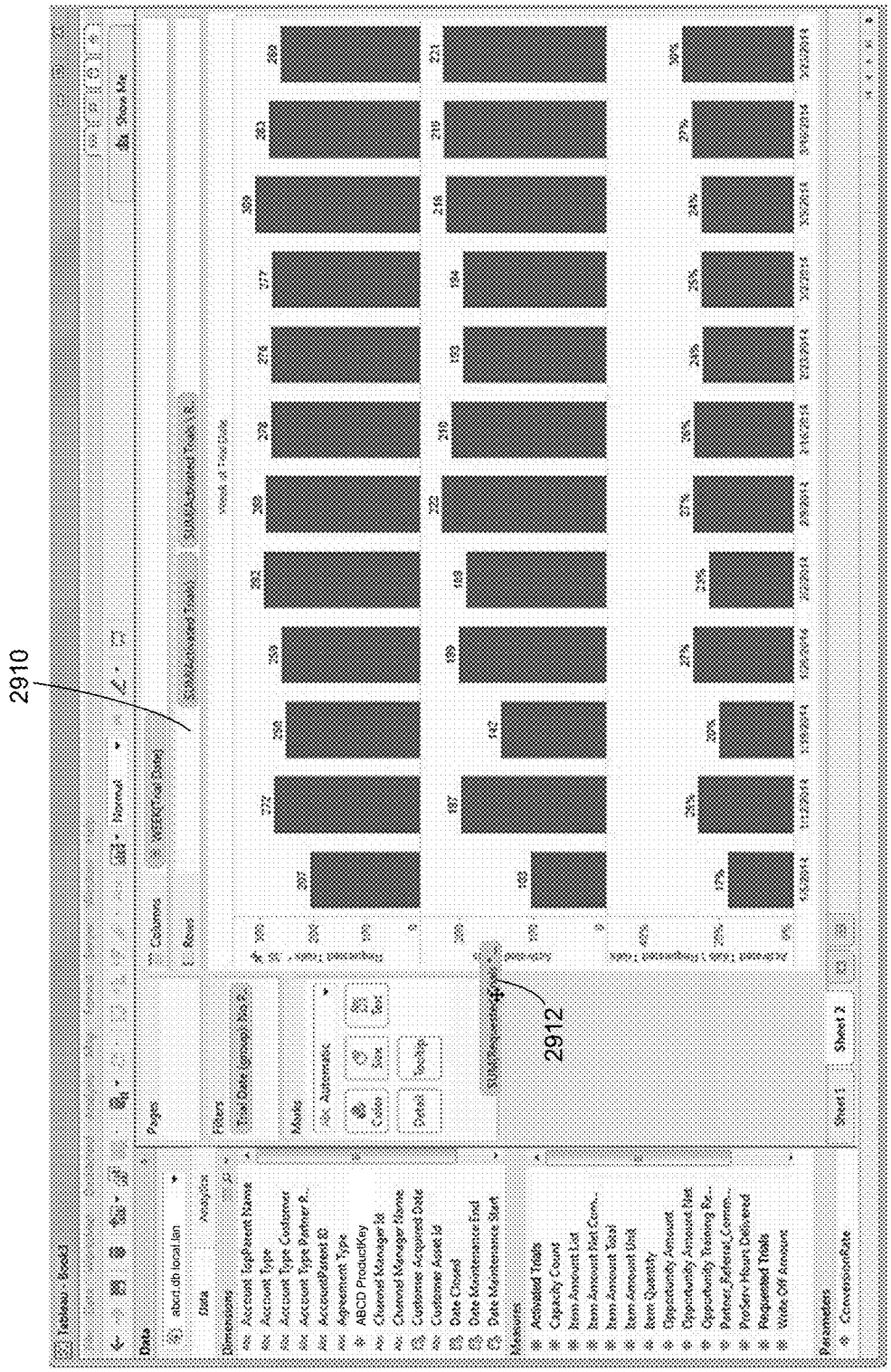
Figure 30:
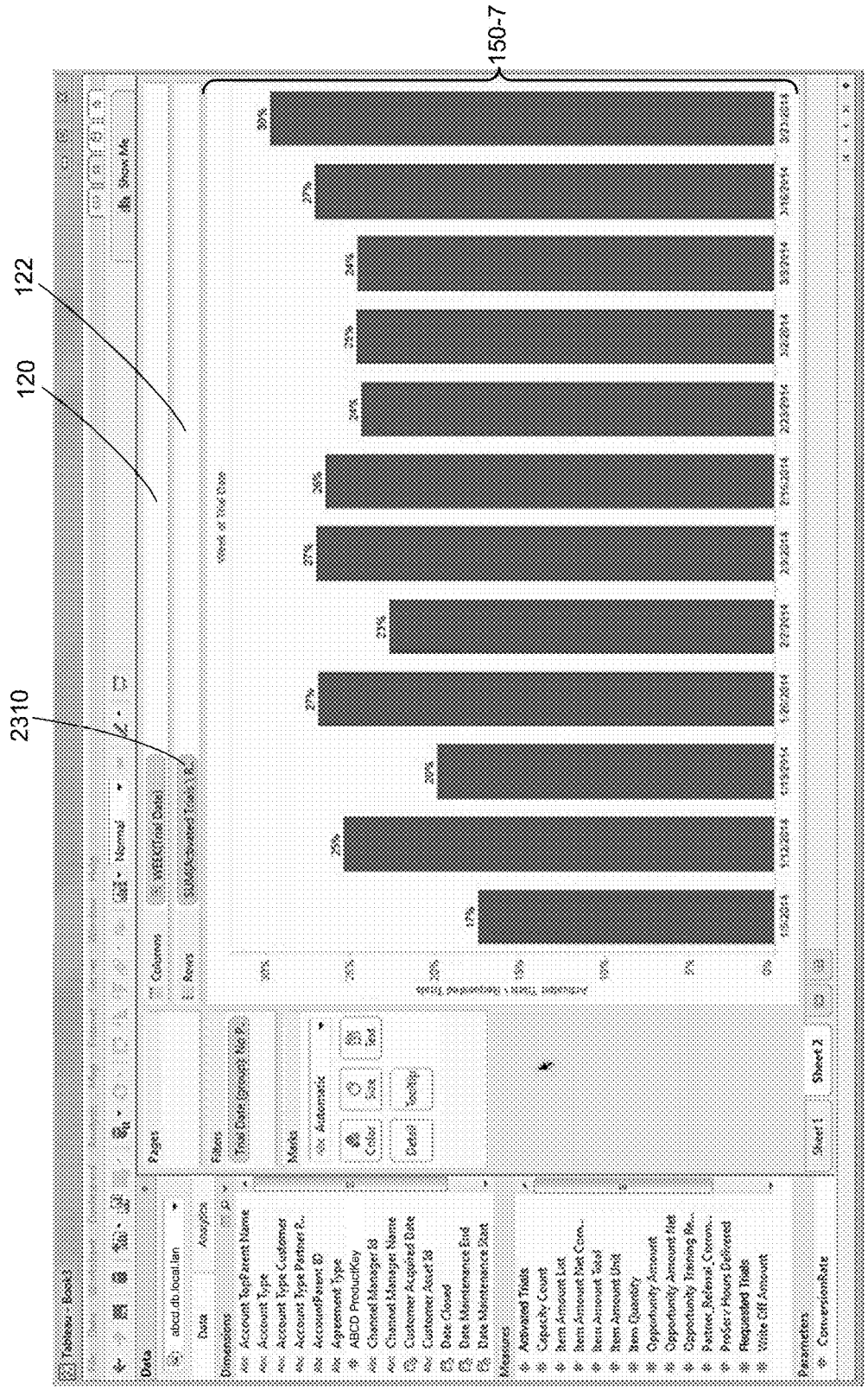

FIG. 29 illustrates that a user may remove items from a shelf by dragging them away. In this case, the user drags the first pill 2912 away. During the drag operation, there is a blank space 2910 in the row shelf region. FIG. 30 shows that after the first two pills are dragged away, the remaining pill 2310 is repositioned to the left and the data visualization region 112 is updated with a seventh visual graphic 150-7.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating a graphical representation of a data source, comprising:
    at a computer having one or more processors and memory:
    generating and displaying a graphical user interface on a computer display, wherein the graphical user interface includes a schema information region and a data visualization region, wherein the schema information region includes multiple field names, each field name associated with a data field from the data source, wherein the data visualization region includes a plurality of shelf regions that determine characteristics of a visual graphic displayed in the data visualization region, and wherein each shelf region is configured to receive user placement of one or more of the field names from the schema information region;
    detecting a user selection of one or more of the field names and a user placement of each user-selected field name in a respective shelf region in the data visualization region;
    receiving user input to initiate editing in a first shelf region, outside of any existing box in the first shelf region, thereby creating a new box, in the first shelf region, containing a first calculated element, which is an expression that includes a plurality of field names, including a first field name, wherein the expression does not match any of the field names in the schema information region;
    receiving a dragging operation that drops an object on top of the first field name within the new box, thereby modifying the first calculated element; and
    generating a visual graphic in accordance with the data source and content of respective shelf regions, including user-selected field names and the first calculated element, and displaying the visual graphic in the data visualization region.

2. The method of claim 1, wherein the plurality of shelf regions includes a row shelf region and a column shelf region, wherein the visual graphic includes visual marks corresponding to retrieved tuples from the data source, wherein vertical and horizontal placement of the visual marks are respectively based on items in the row shelf region and column shelf region respectively, and wherein each item of the items comprises a user-selected field name or the first calculated element.

3. The method of claim 2, wherein the items in the row shelf region include the first calculated element.

4. The method of claim 1, wherein each shelf region includes zero or more items, each item comprising a field name or the first calculated element, and wherein each respective item is displayed within a respective unique box in a respective shelf region.

5. The method of claim 1, including detecting second user input to edit the first shelf region, resulting in a second calculated element in the first shelf region, wherein detecting the second user input to edit the first shelf region comprises:
    receiving typing input in a first box in the first shelf region, thereby converting content of the first box from a second field name to a formula for the second calculated element.

6. The method of claim 5, wherein the typing input is concatenated with the second field name already in the first box, so that the formula includes the second field name.

7. The method of claim 1, wherein receiving user input to initiate editing in the first shelf region comprises:
    receiving textual user input in the new box, thereby creating the first calculated element.

8. The method of claim 7, wherein the textual user input is received by one or more means selected from the group consisting of: typing into the new box, pasting of text into the new box, dragging a field from the schema information region into the new box, dragging of text from another user interface object into the new box, and dragging of a non-textual user interface object into the new box.

9. The method of claim 8, wherein dragging a non-textual user interface object into the new box modifies existing content of the new box by concatenating the existing content with a string corresponding to a formula for the non-textual user interface object.

10. The method of claim 1, further comprising:
    in response to receiving the dragging operation, modifying the existing content of the new box by replacing the first field name with an expression corresponding to the dragging operation.

11. The method of claim 1, including detecting second user input to edit the first shelf region, resulting in a second calculated element in the first shelf region, wherein the first shelf region includes a first box, and wherein detecting the second user input to edit the first shelf region comprises:
    receiving user input to open a calculation edit window corresponding to the first box;
    receiving textual user input into the opened calculation edit window, wherein the textual input becomes a formula for the second calculated element; and
    receiving user input to apply the formula for the second calculated element.

12. The method of claim 11, wherein the textual user input is received by one or more means selected from the group consisting of: typing into the calculation edit window, pasting of text into the calculation edit window, dragging a field from the schema information region into the calculation edit window, dragging of text from another user interface object into the calculation edit window, and dragging of a non-textual user interface object into the calculation edit window.

13. The method of claim 11, further comprising:
    receiving user input to select a portion of text in the calculation edit window;
    receiving user input to paste the selected portion of text into a second shelf region distinct from the first shelf region, thereby creating a second box in the second shelf region, wherein a formula for the second box is the selected portion of text; and generating an updated visual graphic in accordance with the data source and content of respective shelf regions, including user-selected field names, the first calculated element, and the second calculated element, and displaying the updated visual graphic in the data visualization region.

14. The method of claim 11, wherein receiving user input to open the calculation edit window corresponding to the first box comprises receiving user input to activate an editor icon corresponding to the first box.

15. The method of claim 1, further comprising:
receiving user input to copy the first calculated element to the schema information region; and
in response to the user input to copy the first calculated element:
creating a new field name in the schema information region whose calculation formula corresponds to the first calculated element; and
updating the first calculated element in the first shelf region to refer to the new field name.

16. The method of claim 1, further comprising:
receiving subsequent user input to edit the first calculated element, thereby creating a second calculated element that replaces the first calculated element; and
generating an updated visual graphic in accordance with the data source and content of respective shelf regions, including user-selected field names and the second calculated element, and displaying the updated visual graphic in the data visualization region.

17. A client device, comprising:
one or more processors;
memory; and
one or more programs stored in the memory and configured for execution by the one or more processors, the one or more programs comprising instructions for:
generating and displaying a graphical user interface on a computer display, wherein the graphical user interface includes a schema information region and a data visualization region, wherein the schema information region includes multiple field names, each field name associated with a data field from the data source, wherein the data visualization region includes a plurality of shelf regions that determine characteristics of a visual graphic displayed in the data visualization region, and wherein each shelf region is configured to receive user placement of one or more of the field names from the schema information region;
detecting a user selection of one or more of the field names and a user placement of each user-selected field name in a respective shelf region in the data visualization region;
receiving user input to initiate editing in a first shelf region, outside of any existing box in the first shelf region, thereby creating a new box, in the first shelf region, containing a first calculated element, which is an expression that includes a plurality of field names, including a first field name, wherein the expression does not match any of the field names in the schema information region;
receiving a dragging operation that drops an object on top of the first field name within the new box, thereby modifying the first calculated element; and
generating a visual graphic in accordance with the data source and content of respective shelf regions, including user-selected field names and the first calculated element, and displaying the visual graphic in the data visualization region.

18. The device of claim 17, wherein each shelf region includes zero or more items, each item comprising a field name or the first calculated element, and wherein each respective item is displayed within a respective unique box in a respective shelf region.

19. The device of claim 17, wherein the one or more programs further comprise instructions for detecting second user input to edit the first shelf region, resulting in a second calculated element in the first shelf region, wherein detecting the second user input to edit the first shelf region comprises:
receiving typing input in a first box in the first shelf region, thereby converting content of the first box from a second field name to a formula for the second calculated element.

20. The device of claim 17, wherein receiving user input to edit the first shelf region comprises:
receiving textual user input in the new box, thereby creating the first calculated element.

21. The device of claim 20, wherein the textual user input is received by one or more means selected from the group consisting of: typing into the new box, pasting of text into the new box, dragging a field from the schema information region into the new box, dragging of text from another user interface object into the new box, and dragging of a non-textual user interface object into the new box.

22. The device of claim 21, wherein dragging a non-textual user interface object into the new box modifies existing content of the new box by concatenating the existing content with a string corresponding to a formula for the non-textual user interface object.

23. The device of claim 17, wherein the one or more programs further comprise instructions for:
in response to receiving the dragging operation, modifying the existing content of the new box by replacing the first field name with an expression corresponding to the dragging operation.

24. The device of claim 17, wherein the one or more programs include instructions for detecting second user input to edit the first shelf region, resulting in a second calculated element in the first shelf region, wherein the first shelf region includes a first box, and wherein detecting the second user input to edit the first shelf region comprises:
receiving user input to open a calculation edit window corresponding to the first box;
receiving textual user input into the opened calculation edit window, wherein the textual input becomes a formula for the second calculated element; and
receiving user input to apply the formula for the second calculated element.

25. The device of claim 24, further comprising:
receiving user input to select a portion of text in the calculation edit window;
receiving user input to paste the selected portion of text into a second shelf region distinct from the first shelf region, thereby creating a second box in the second shelf region, wherein a formula for the second box is the selected portion of text; and
generating an updated visual graphic in accordance with the data source and content of respective shelf regions, including user-selected field names, the first calculated element, and the second calculated element, and displaying the updated visual graphic in the data visualization region.

26. A non-transitory computer readable storage medium storing one or more programs configured for execution by a client device having one or more processors and memory, the one or more programs comprising instructions for:

generating and displaying a graphical user interface on a computer display, wherein the graphical user interface includes a schema information region and a data visualization region, wherein the schema information region includes multiple field names, each field name associated with a data field from the data source, wherein the data visualization region includes a plurality of shelf regions that determine characteristics of a visual graphic displayed in the data visualization region, and wherein each shelf region is configured to receive user placement of one or more of the field names from the schema information region;

detecting a user selection of one or more of the field names and a user placement of each user-selected field name in a respective shelf region in the data visualization region;

receiving user input to initiate editing in a first shelf region, outside of any existing box in the first shelf region, thereby creating a new box, in the first shelf region, containing a first calculated element, which is an expression that includes a plurality of field names, including a first field name, wherein the expression does not match any of the field names in the schema information region;

receiving a dragging operation that drops an object on top of the first field name within the new box, thereby modifying the first calculated element; and generating a visual graphic in accordance with the data source and content of respective shelf regions, including user-selected field names and the first calculated element, and displaying the visual graphic in the data visualization region.

* * * * *